US012754964B2

(12) United States Patent
Misiaszek et al.

(10) Patent No.: US 12,754,964 B2
(45) Date of Patent: Oct. 6, 2026

(54) ARTIFICIAL INTELLIGENCE ASSISTANT WITH DECISION-BASED SELECTOR INTERFACE

(71) Applicant: Truist Bank, Charlotte, NC (US)

(72) Inventors: Alexandra Heath Misiaszek, Wake Forest, NC (US); LaTonja Barlow, Olathe, KS (US)

(73) Assignee: TRUIST BANK, Charlotte, NC (US)

( * ) Notice: Subject to any disclaimer, the term of this patent is extended or adjusted under 35 U.S.C. 154(b) by 0 days.

(21) Appl. No.: 19/093,346

(22) Filed: Mar. 28, 2025

(65) Prior Publication Data

US 2026/0300415 A1 Oct. 1, 2026

(51) Int. Cl.
*G06F 16/9535* (2019.01)
*H04L 51/02* (2022.01)

(52) U.S. Cl.
CPC .......... *G06F 16/9535* (2019.01); *H04L 51/02* (2013.01)

(58) Field of Classification Search
CPC ............................ G06F 16/9835; H04L 51/02
See application file for complete search history.

(56) References Cited

U.S. PATENT DOCUMENTS

| | | | | |
|---|---|---|---|---|
| 2019/0108285 | A1* | 4/2019 | Stillwell, Jr. | G06F 16/951 |
| 2024/0346102 | A1* | 10/2024 | Miller | G06F 16/9577 |
| 2025/0094690 | A1* | 3/2025 | DeCharms | G06N 20/00 |
| 2025/0131362 | A1* | 4/2025 | Solomon | G06Q 10/0637 |
| 2025/0335513 | A1* | 10/2025 | Fan | G06F 16/908 |
| 2025/0362954 | A1* | 11/2025 | Sullivan | G06F 9/4881 |

* cited by examiner

*Primary Examiner* — Dangelino N Gortayo
(74) *Attorney, Agent, or Firm* — Michael A. Springs, Esq.; Shumaker, Loop & Kendrick, LLP; Patrick B. Horne

(57) ABSTRACT

Methods, storage media, and apparatuses to integrate a chatbot into a web page provided to a client device. The chatbot may analyzes the content of the web page and outputs multiple prompts. The chatbot then collects user responses to these prompts and based on those responses, generates a decision that identifies a specific resource from a plurality of available resources.

19 Claims, 15 Drawing Sheets

ARTIFICIAL INTELLIGENCE ASSISTANT WITH DECISION-BASED SELECTOR INTERFACE

BACKGROUND

Accurately processing natural language presents several challenges. One challenge is ambiguity. Natural language can be ambiguous, with different meanings possible for the same words or phrases depending on the context. For example, virtual agents may struggle with less common, highly nuanced, or context-dependent queries. Another challenge is the need for real-time processing. Client devices often require quick responses, necessitating a balance between virtual agent complexity, which enhances understanding, and computational efficiency, which affects response time.

Moreover, ensuring that responses are not only accurate but also relevant and useful is a challenge. Limitations in the training data, inconsistencies in language data, or insufficient domain-specific information can lead to inaccurate or irrelevant responses.

BRIEF SUMMARY

In various embodiments, a method involves a processor receiving a request from a client device to access a web page. The processor provides the client device with the web page that includes an artificial intelligence (AI) chatbot. The AI chatbot determines the content of the web page and outputs a series of prompts related to the content. It then receives a series of responses to these prompts and, based on these responses, outputs a decision that includes selecting a first resource from multiple available resources.

Additionally, a non-transitory computer-readable storage medium is described, which contains instructions that, when executed by a processor, cause the processor to: receive a web page access request from a client device, provide the web page with an AI chatbot, determine the page content, output prompts, receive responses, and make a decision concerning a resource.

An apparatus comprising a processor and a memory storing instructions is also described. When executed by the processor, these instructions cause the processor to: receive a request from a client device to access a web page, provide the web page with an AI chatbot, determine the content of the page, output related prompts, receive responses to the prompts, and output a decision involving the selection of a resource from multiple resources.

The features, functions, and advantages that have been described herein may be achieved independently in various embodiments of the present disclosure including computer-implemented methods, computer program products, and computing systems or may be combined in yet other embodiments, further details of which can be seen with reference to the following description and drawings.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
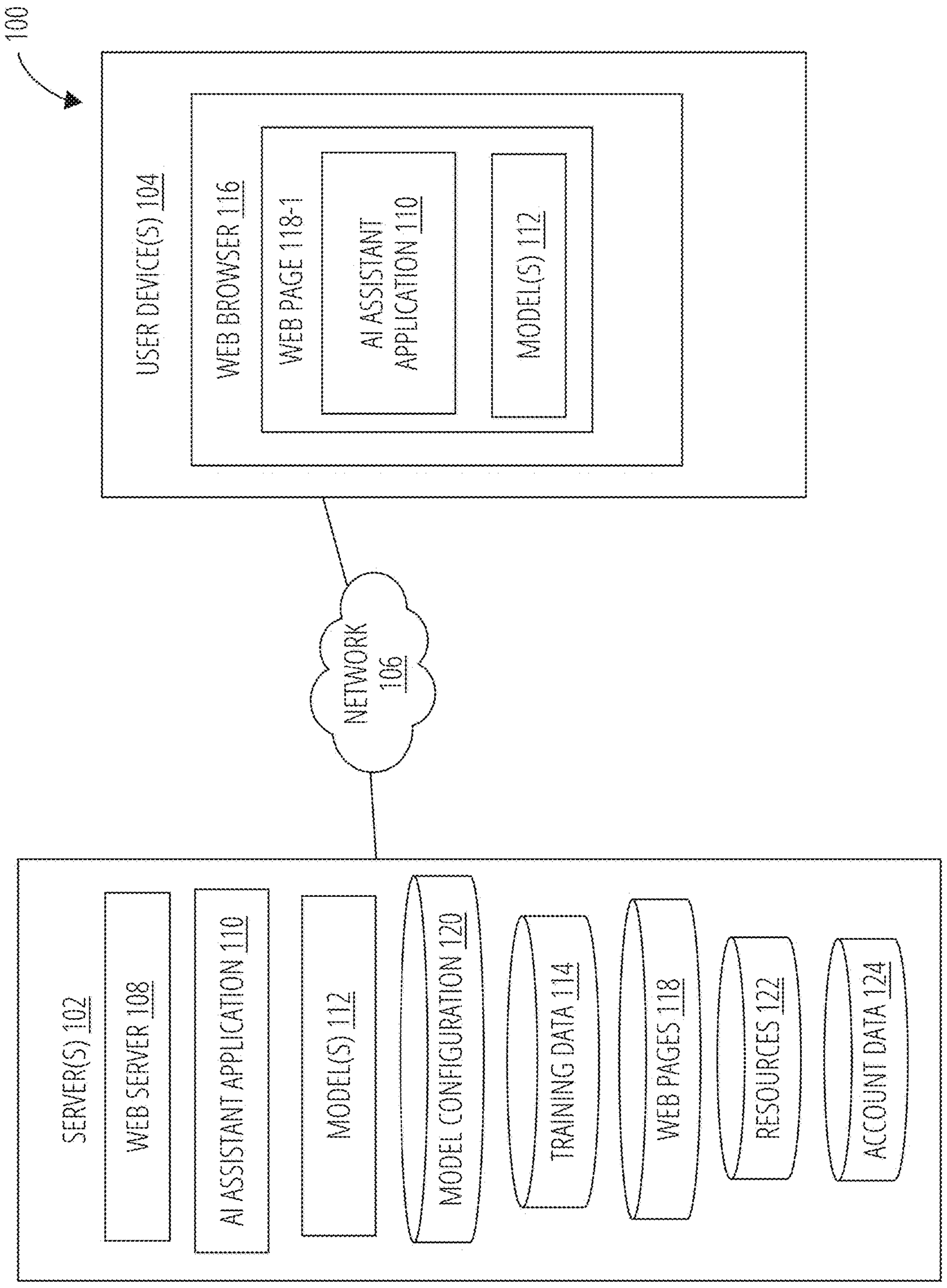

Having thus described embodiments in general terms, reference will now be made to the accompanying drawings, wherein:

FIG. 1 illustrates an aspect of the subject matter in accordance with one embodiment.

Figure 2A:
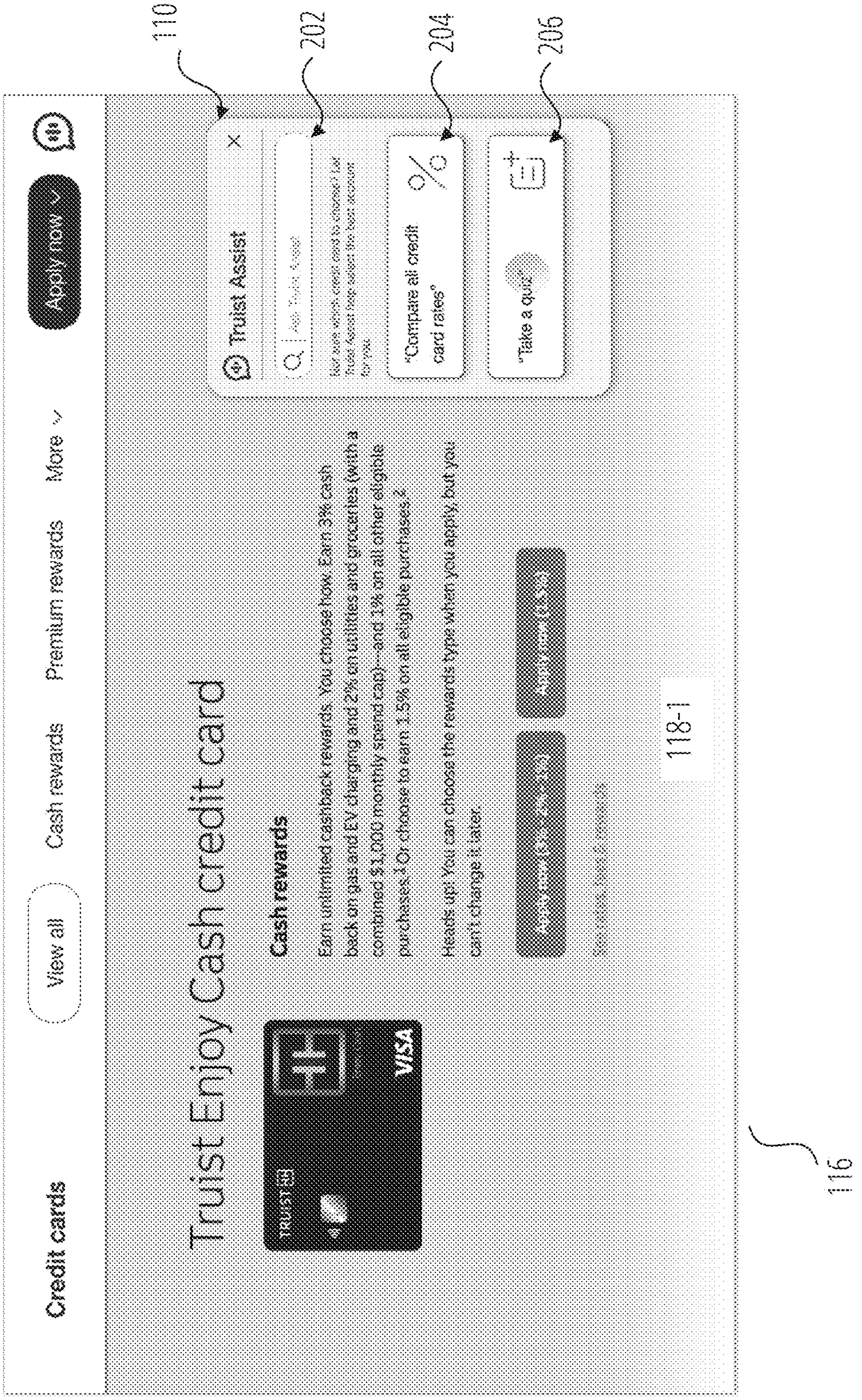

FIG. 2A illustrates an aspect of the subject matter in accordance with one embodiment.

Figure 2B:
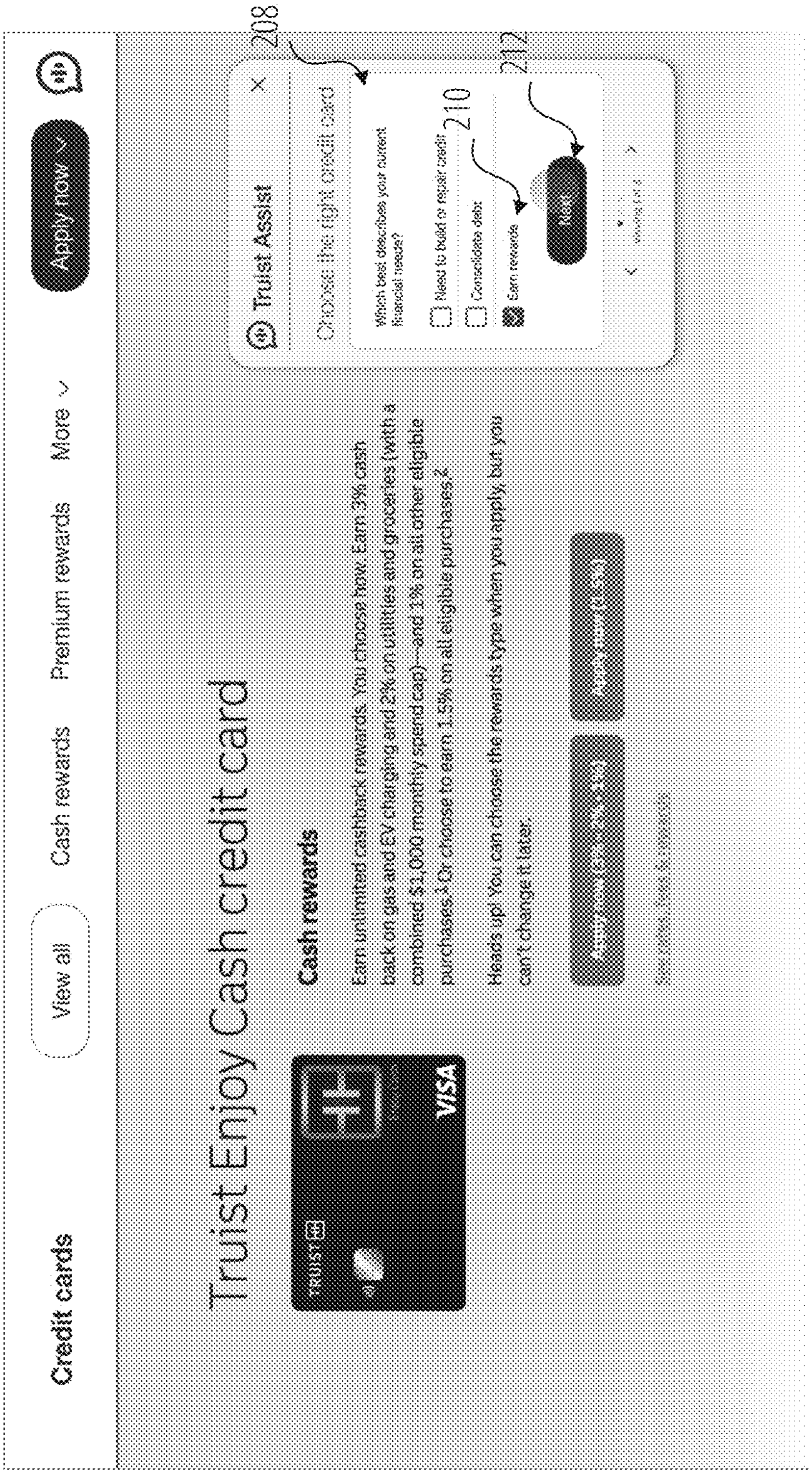

FIG. 2B illustrates an aspect of the subject matter in accordance with one embodiment.

Figure 2C:
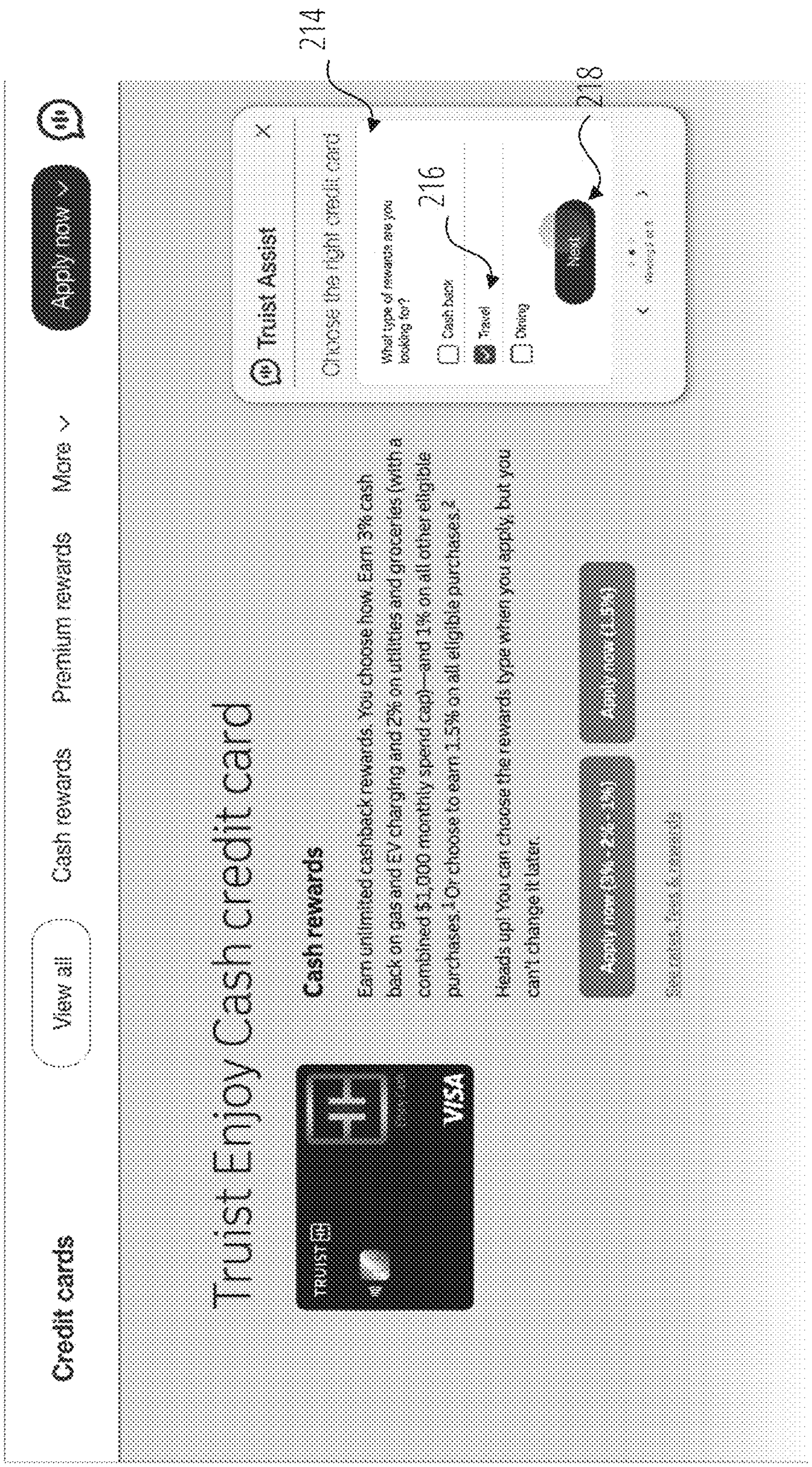

FIG. 2C illustrates an aspect of the subject matter in accordance with one embodiment.

Figure 2D:
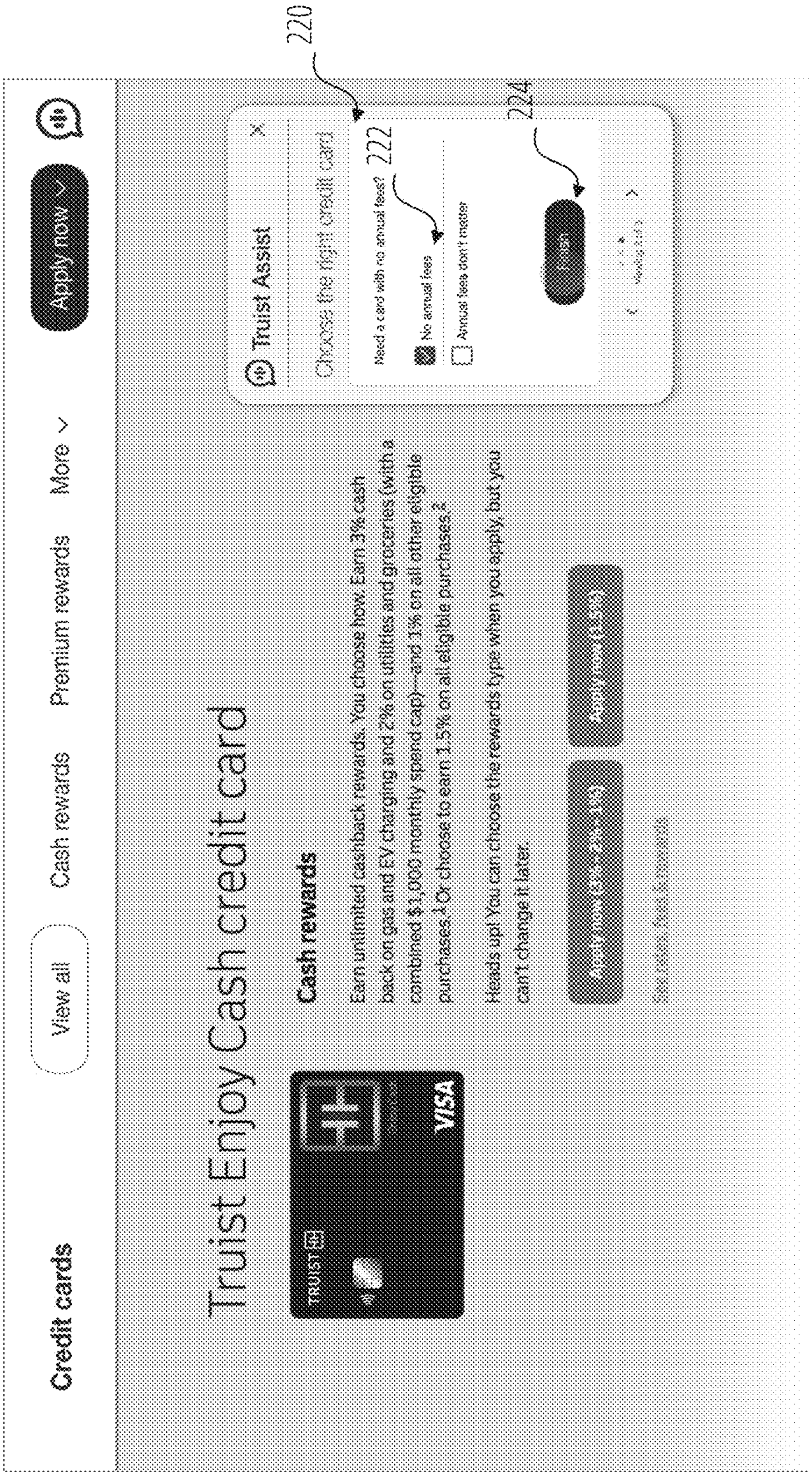

FIG. 2D illustrates an aspect of the subject matter in accordance with one embodiment.

Figure 2E:
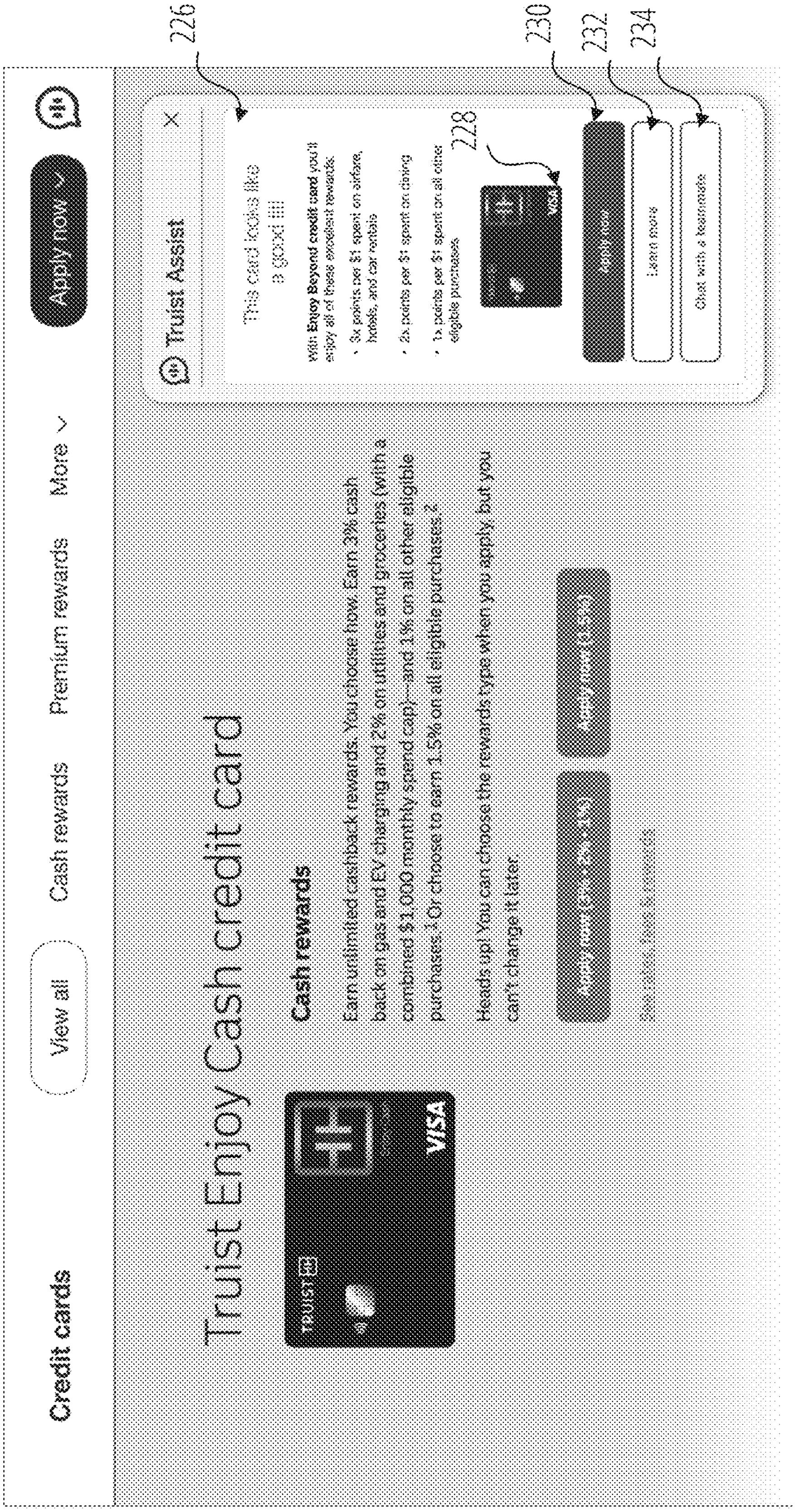

FIG. 2E illustrates an aspect of the subject matter in accordance with one embodiment.

Figure 3:
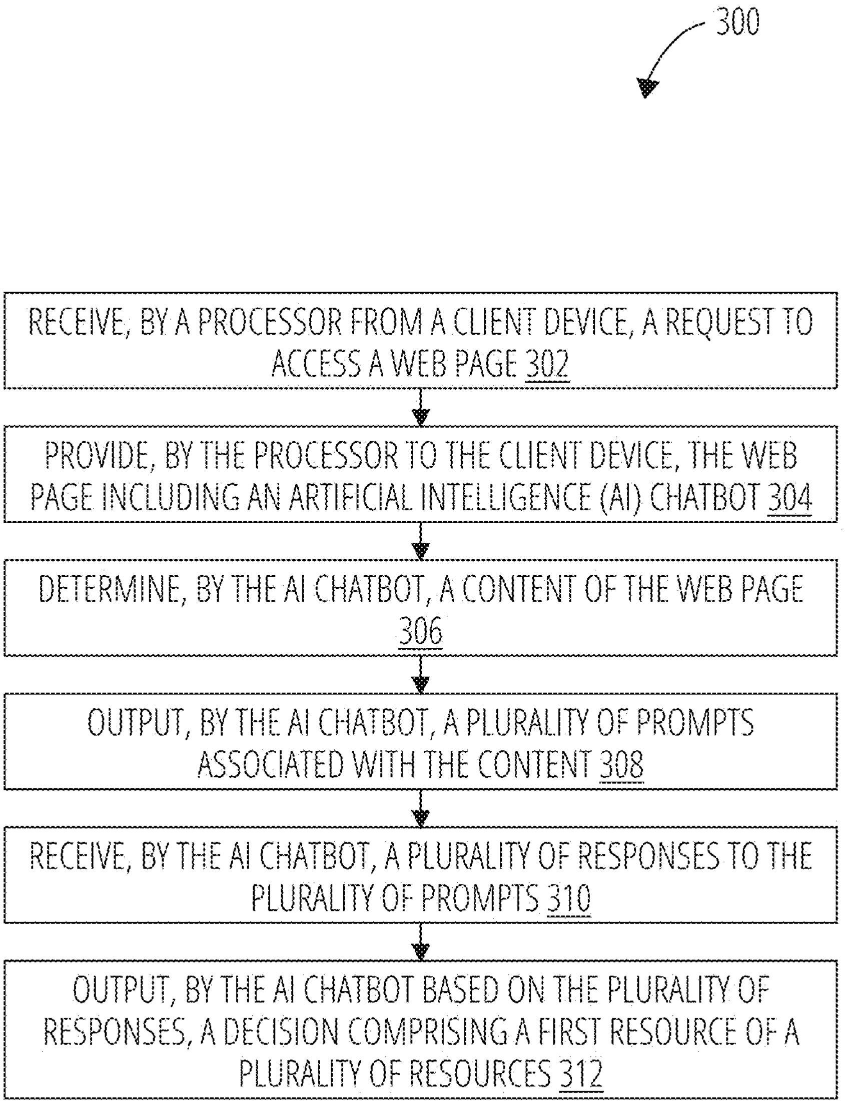

FIG. 3 illustrates a logic flow 300 in accordance with one embodiment.

Figure 4A:
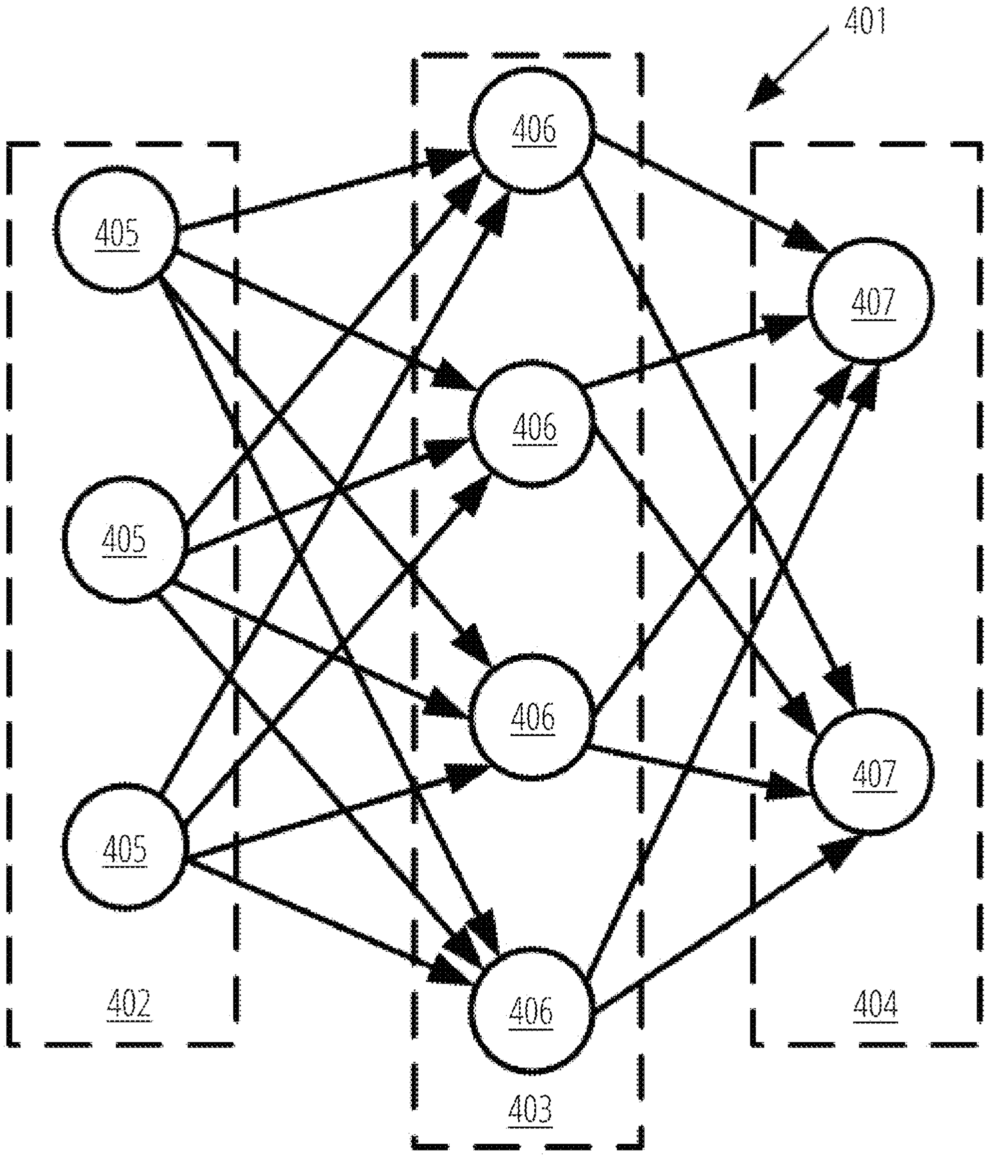

FIG. 4A is a diagram of a feedforward network, according to at least one embodiment, utilized in machine learning.

Figure 4B:
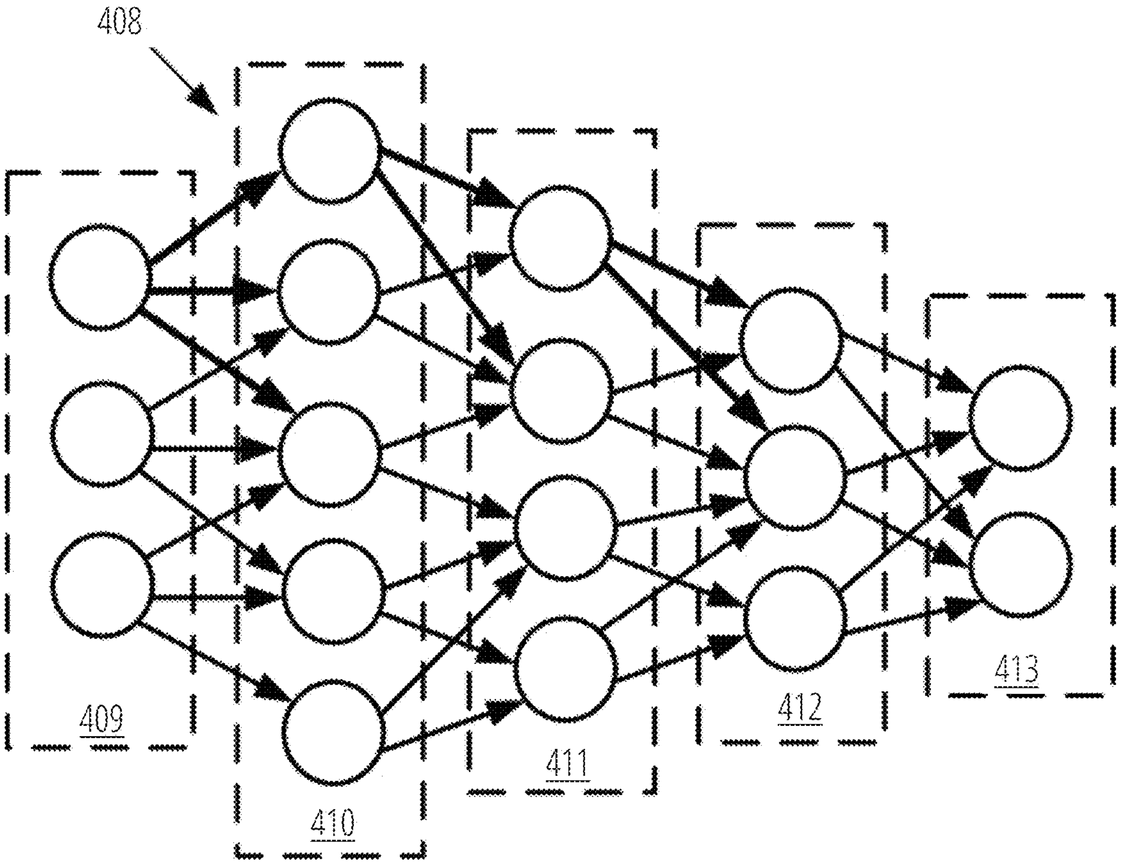

FIG. 4B is a diagram of a convolutional neural network, according to at least one embodiment, utilized in machine learning.

Figure 4C:
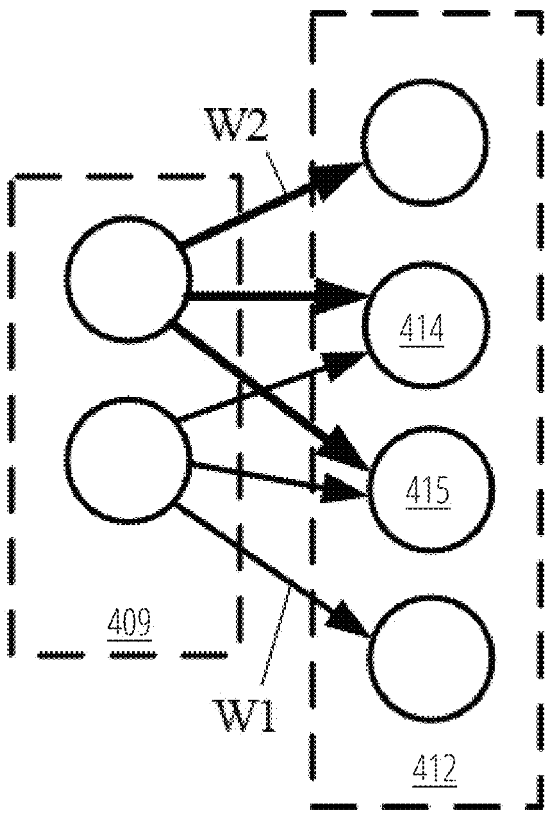

FIG. 4C is a diagram of a portion of the convolutional neural network of FIG. 4B, according to at least one embodiment, illustrating assigned weights at connections or neurons.

Figure 5:
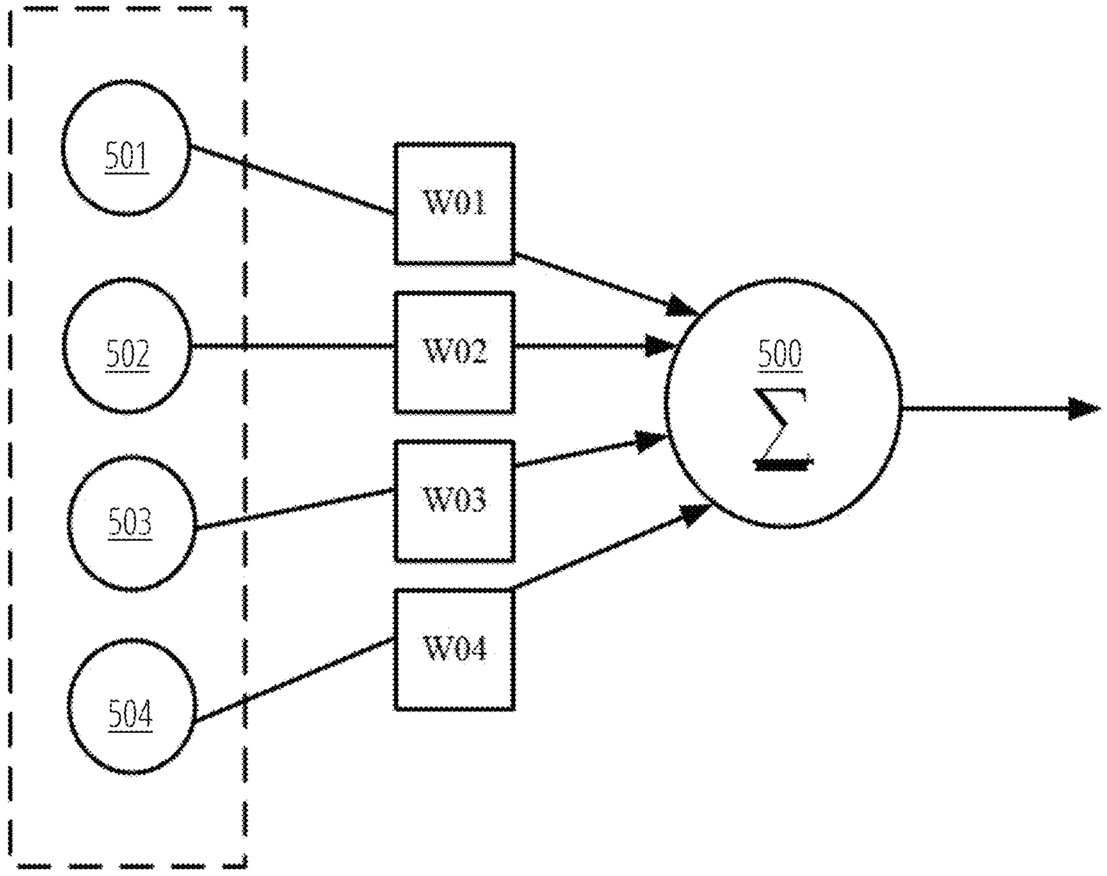

FIG. 5 is a diagram representing an exemplary weighted sum computation in a node in an artificial neural network.

Figure 6:
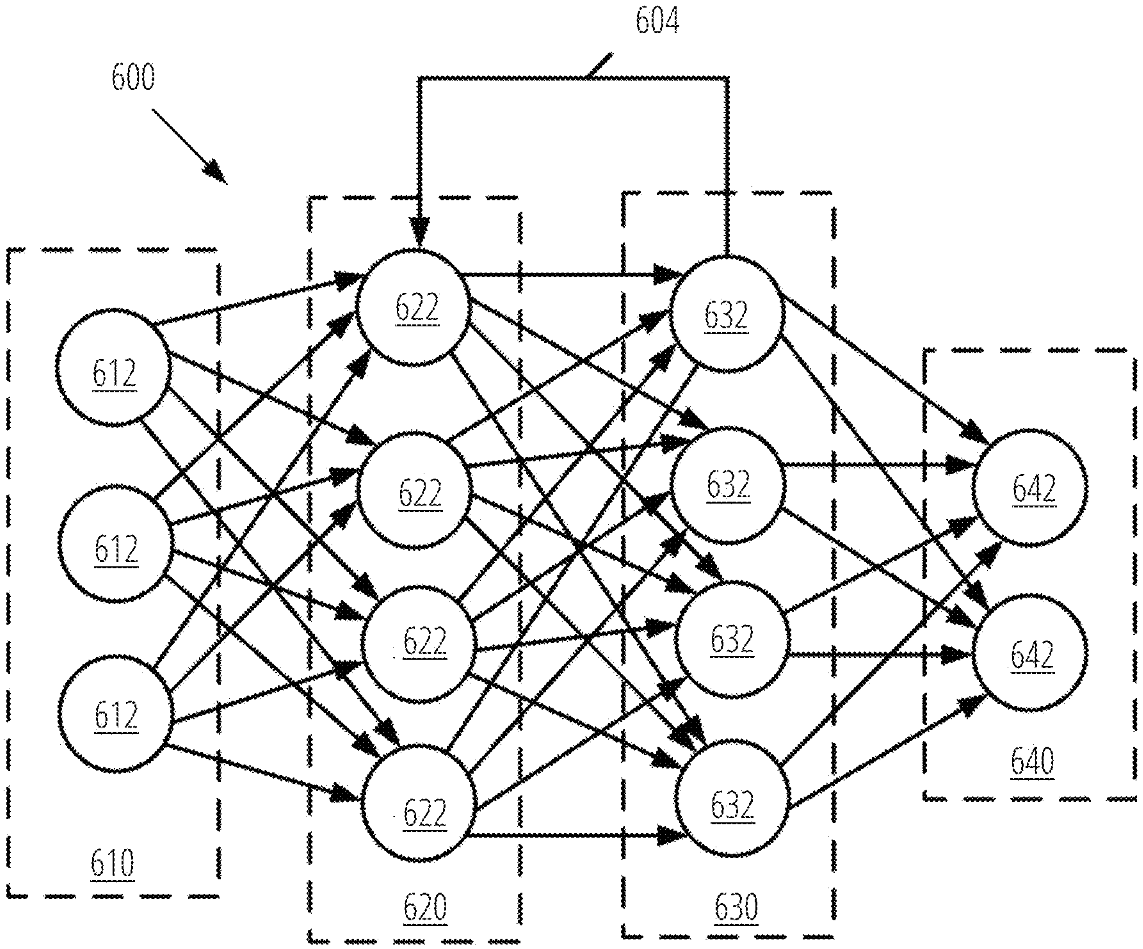

FIG. 6 is a diagram of a Recurrent Neural Network (RNN), according to at least one embodiment, utilized in machine learning.

Figure 7:
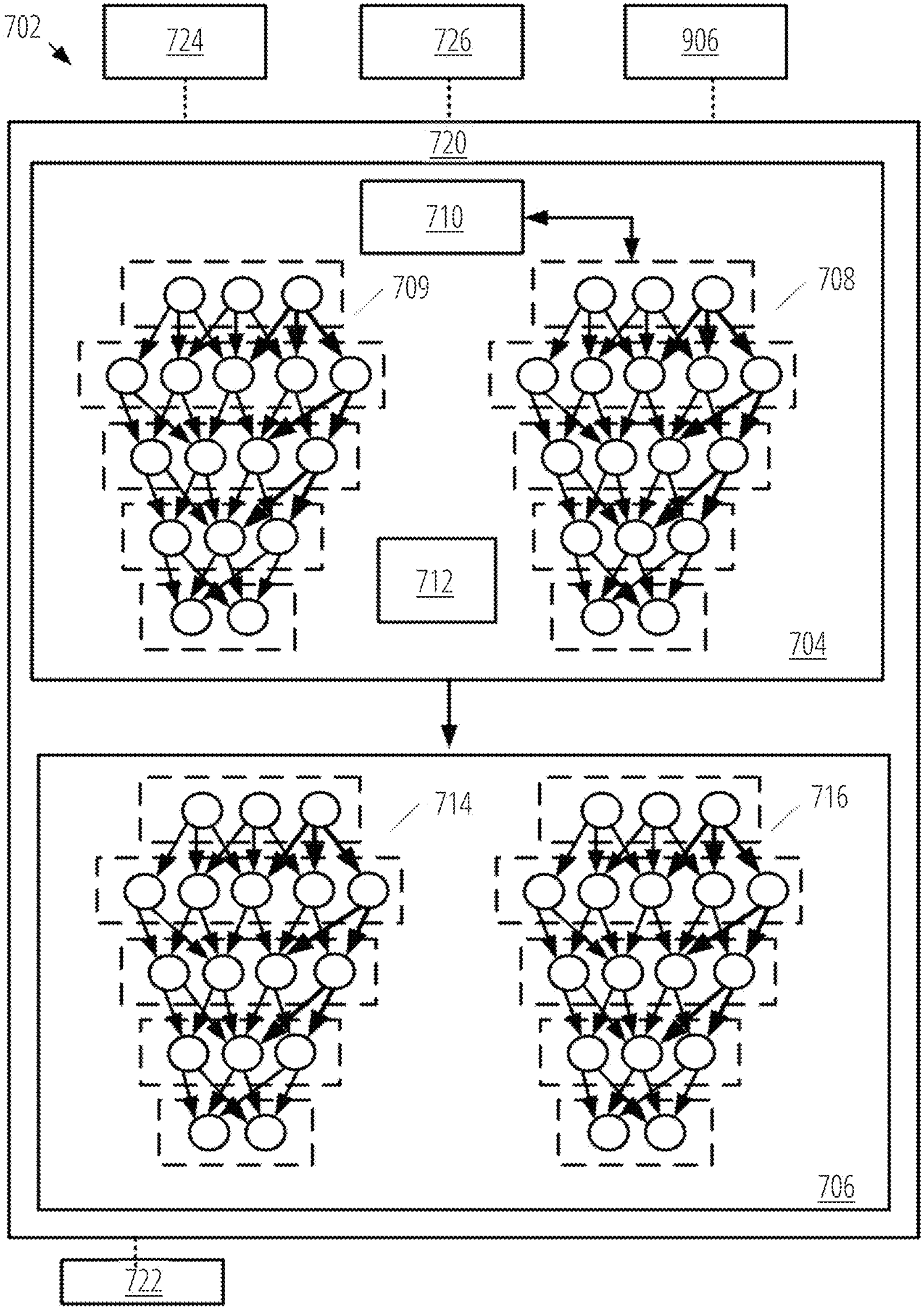

FIG. 7 is a schematic logic diagram of an artificial intelligence program including a front-end and a back-end algorithm.

Figure 8:
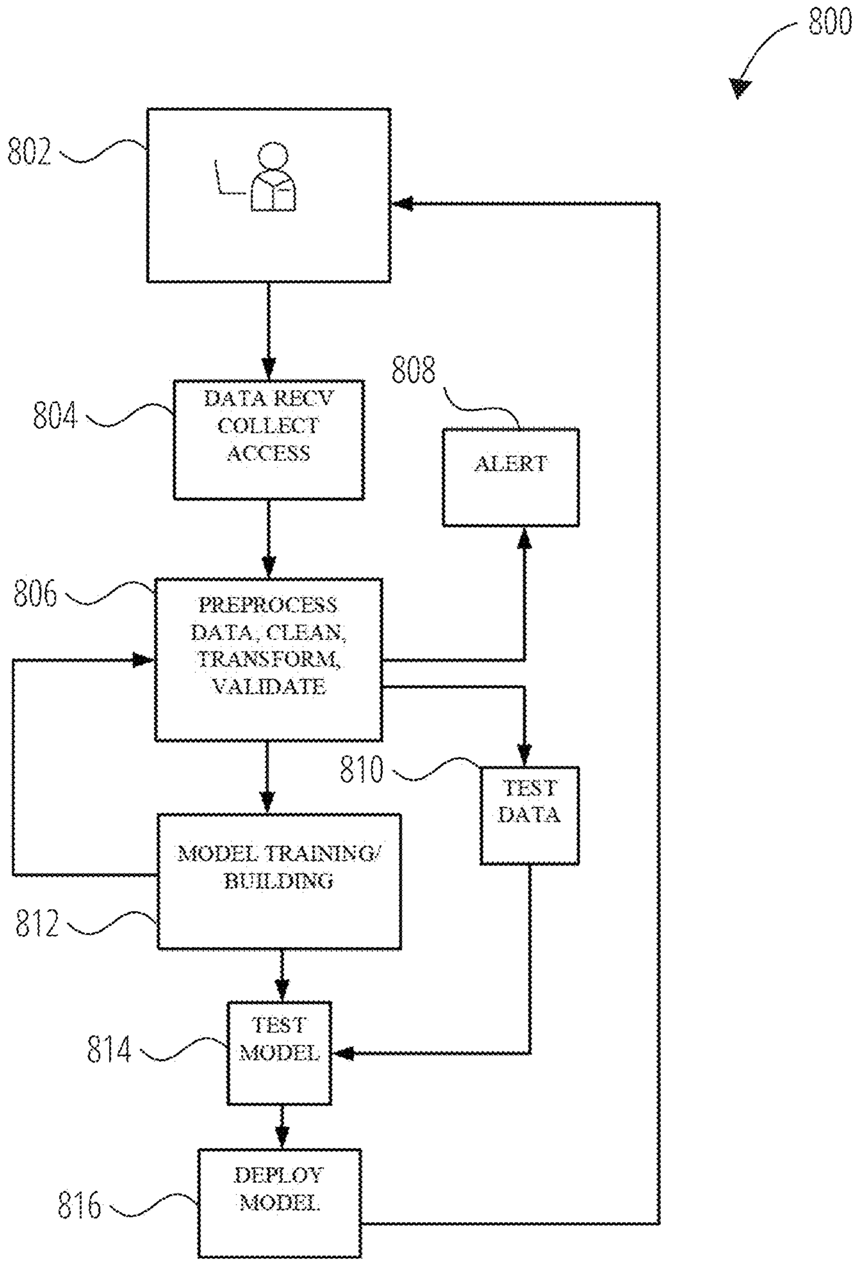

FIG. 8 is a flow chart representing a method, according to at least one embodiment, of model development and deployment by machine learning.

Figure 9:
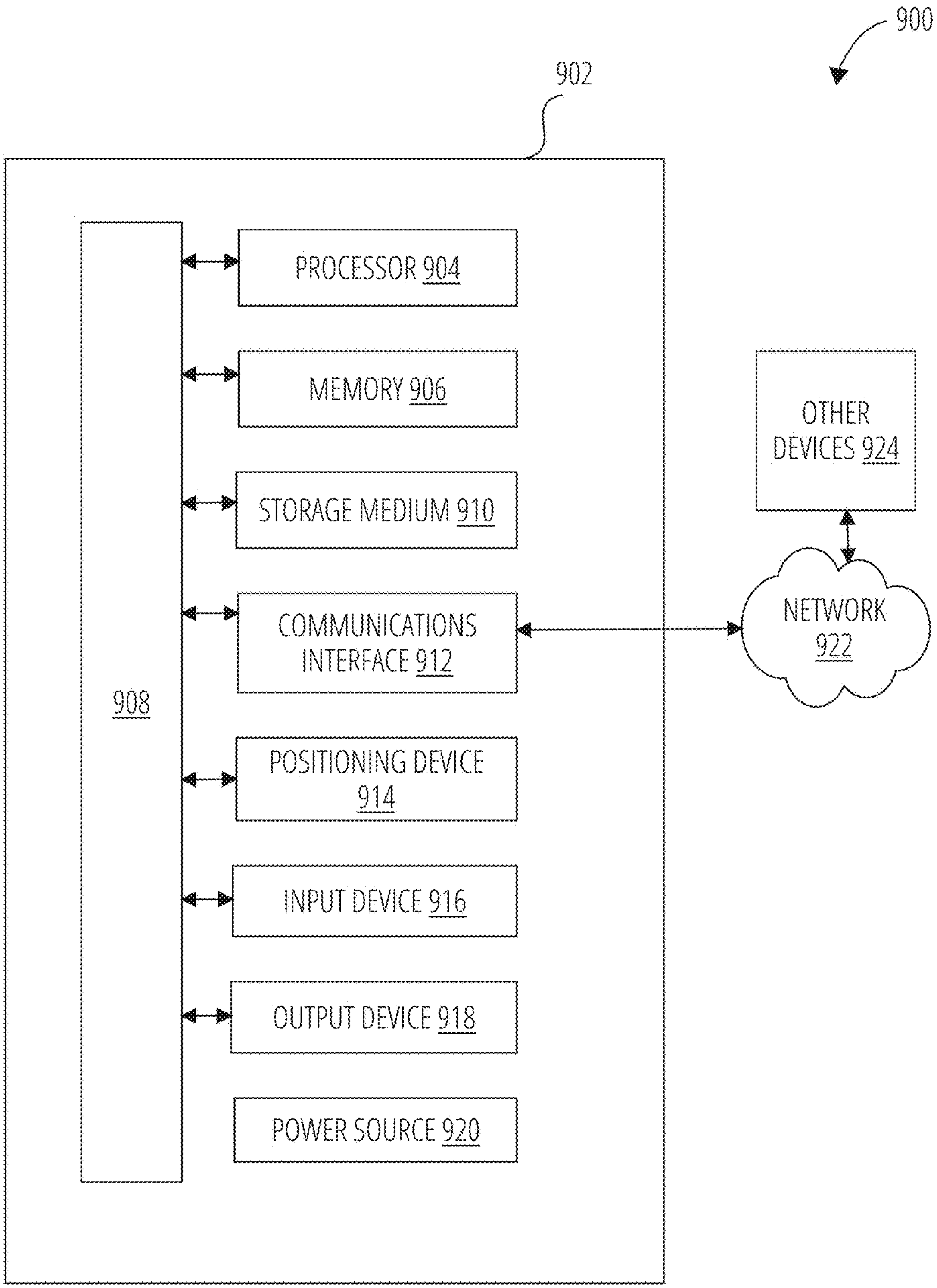

FIG. 9 illustrates a computing system 900 in accordance with one embodiment.

DETAILED DESCRIPTION

Embodiments disclosed herein provide advanced artificial intelligence (AI) technologies to assist users in selecting resources from a plurality of resources. In some embodiments, an AI chatbot may be implemented via one or more AI models, such as a large language model, neural network, etc. In some embodiments, the AI chatbot is provided by a financial institution and is publicly available via, including people who hold accounts at the financial institution and people who do not hold accounts at the financial institution. In some embodiments, the AI chatbot is provided via one or more web pages.

The AI chatbot may assist users in any number and type of contexts, such as providing personalized product recommendations. In some embodiments, a user spends a certain amount of time on a product page, the AI chatbot is triggered to appear, offering assistance in finding the most suitable product. The AI chatbot engages users through a product selector quiz module, presenting a series of questions to understand their preferences and needs. Based on the user's responses, the AI chatbot may utilizes a decision tree model to generate tailored recommendations. Additionally, users may have the option to compare multiple products side-by-side, highlighting key features and benefits. By integrating artificial intelligence and machine learning algorithms, the accuracy of recommendations are improved relative to conventional solutions. This approach ensures that users receive product suggestions that best match their individual requirements, thereby improving their overall experience on the website.

The integration of AI models in the chatbot may enhance the chatbot's ability to understand varied user inputs. In some embodiments, the AI models may be trained to generate responses based on pre-approved content and set guardrails. Doing so may reduce the need for manual training of the AI chatbot, improves confidence scores for responses generated by the AI chatbot, and improve accuracy in responses generated by the AI chatbot.

To ensure accuracy and appropriateness, guardrails may be implemented for content generation in the AI chatbot. Data may be used to train the AI chatbot and/or be used to provide a source of information used by the AI chatbot when generating responses. Furthermore, the responses generated by the chatbot may be based on decision trees, pre-approved text, concepts, data types, etc., ensuring no sensitive data is exposed in the public interactions with the AI chatbot. The AI chatbot may be retrained based on feedback, e.g., whether a response was correct, inaccurate, etc.

Advantageously, embodiments disclosed herein leverage advanced AI technologies to enhance user engagement, recommend products, and generally respond to user queries. Doing so provides accurate and relevant information to users in real-time. The integration of AI chatbots may reduce the need for manual bot training, improves response accuracy, and enhances the overall user experience by understanding varied user inputs and generating appropriate responses.

More specifically, embodiments disclosed herein leverage data ingestion and curation processes to ensure that only relevant and appropriate information is used for training the AI chatbot. The implementation of guardrails ensures that the generated content is accurate, appropriate, and compliant with legal and regulatory standards. Doing so may improve the performance of computing systems and/or AI-based systems, e.g., by improving the accuracy of responses and limiting the types of responses that can be generated by AI components. Furthermore, using the trained chatbot, embodiments disclosed herein may generate more accurate predictions for product selectors. Embodiments are not limited in these contexts.

Aspects of the present disclosure and certain features, advantages, and details thereof are explained more fully below with reference to the non-limiting examples illustrated in the accompanying drawings. Descriptions of well-known processing techniques, systems, components, etc. are omitted so as to not unnecessarily obscure the disclosure in detail. It should be understood that the detailed description and the specific examples, while indicating aspects of the disclosure, are given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular embodiment of the concepts disclosed herein.

Unless described or implied as exclusive alternatives, features throughout the drawings and descriptions should be taken as cumulative, such that features expressly associated with some particular embodiments can be combined with other embodiments. Like numbers refer to like elements throughout.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the disclosure. Therefore, it is to be understood that, within the scope of the included claims, the disclosure may be practiced other than as specifically described herein.

Additionally, illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

As understood by one skilled in the art, program code, as referred to in this application, can include both software and hardware. For example, program code in certain embodiments of the present disclosure can include fixed function hardware, while other embodiments can utilize a software-based implementation of the functionality described. Certain embodiments combine both types of program code.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

FIG. 1 illustrates a system 100 according to one embodiment. As shown, the system 100 includes one or more servers 102 and one or more user devices 104 communicably coupled via one or more networks 106. The servers 102 and user devices 104 are representative of any type of physical and/or virtualized computing system. The servers 102 and user devices 104 each include at least one processor for executing instructions and at least one memory for storing instructions, each not pictured for the sake of clarity. In some embodiments, the components of the system 100 may be spread over various geographical locations.

As shown, the server 102 includes a web server 108, an AI assistant application 110, one or more models 112, a data store of model configuration 120, a data store of training data 114, a data store of a plurality of web pages 118, a data store of a plurality of resources 122, and a data store of account data 124. The AI assistant application 110 provides an AI-based chatbot via one or more of the models 112 that is configured to assist users in a variety of contexts. The models 112 may operate based on the model configuration 120, which may include one or more decision trees. The models 112 may be any type of AI model, such as a neural network, a large language model (LLM), machine learning model, etc. The models 112 may be trained based on training data 114

Although depicted as an application, the web server 108, AI assistant application 110 and/or the models 112 may be implemented as any type of executable code, such as services, microservices, processes, AI agents, and the like. In some embodiments, the AI assistant application 110 and/or one or more of the models 112 may collectively define at least a portion of an AI agent.

An AI agent is an autonomous system designed to perform tasks, make decisions, and adapt based on data and user feedback. An AI agent operates independently, automating processes in various fields, including the ability to generate code, communicate using natural language, etc. AI agents may operate without human intervention, making decisions and taking actions based on their programming and learning. AI agents may use machine learning algorithms to improve their performance over time by learning from data and experiences. Similarly, AI agents can perceive their environment through sensors or data inputs, allowing them to understand and interact with the world around them. Further still, AI agents may process information and make decisions based on logical reasoning, often using techniques like rule-based systems, neural networks, or probabilistic models. AI agents may communicate with humans and other systems through natural language processing, speech recognition, and other interfaces. AI agents may be designed to achieve specific goals or complete tasks, often optimizing their actions to maximize efficiency or effectiveness. Advantageously, AI agents may be scaled to handle large amounts of data and complex tasks, making them suitable for a wide range of applications.

The web server 108 delivers content or services to end-users over the internet. For example, the web server 108 may deliver web pages 118 to the web browser 116 of user devices 104. For example, the web server 108 may that handle hypertext transfer protocol (HTTP) requests including one or more links from the web browsers 116 and return one or more of the web pages 118 associated with the links.

In some embodiments, the web server 108 may present or otherwise include the AI assistant application 110 and/or models 112 as an AI chatbot in each of the web pages 118. In some embodiments, the AI assistant application 110 and/or models 112, as AI chatbot, may be presented to the user after a web page 118 is loaded in the web browser 116. For example, as shown, web page 118-1 including the AI assistant application 110 and one or more of the models 112 may be loaded in the web browser 116. In some embodiments, the AI chatbot is presented after a predetermined duration of time elapses after the web page 118 is loaded in in the web browser 116 (e.g., 5 seconds after the web page 118 is loaded, etc.). Therefore, the web pages 118 and/or AI assistant application 110 may include logic for a timer, e.g., to start the timer when the web page 118 is loaded in the web browser 116 and determine the predetermined duration of time has elapsed since the timer was started.

When loaded in a web page 118, the AI assistant application 110 and/or models 112 may analyze the content of the web page 118 to determine one or more resources 122 associated with the web page 118. The resources 122 may be any type of resource, such as products, services, accounts, payment instruments, etc. In some embodiments, different resources in the resources 122 are associated with metadata attributes. The metadata attributes may include, but are not limited to, a unique identifier, a category that classifies the resource (e.g., electronics, financial services, healthcare, etc.), a detailed description (e.g., the features, benefits, use, etc.) of the resource, pricing information, including cost, discounts, etc., of the resource, manufacturer and/or provider details of the resource, customer reviews and ratings of the resource, warranty or guarantee information for the resource (e.g., terms and duration of coverage), and/or additional specifications, such as dimensions, weight, materials, or technical requirements for the resource.

For example, the web page 118-1 may be associated with a credit card. Often, however, there may be multiple options available in the resources 122, e.g., multiple credit cards. Advantageously, the AI assistant application 110 may guide a user through a plurality of questions, or prompts, designed to identify a decision, e.g., one of the plurality of resources 122.

Training and configuring the models 112 involves several steps to ensure the models 112 can accurately understand and respond to user queries. The process may begin with data ingestion, where training data 114 is received from various sources and aggregated into the training data 114. For example, the training data 114 may include the web pages 118, the resources 122 the model configuration 120 (e.g., one or more decision trees, etc.), user profiles in the account data 124, etc. The training data 114 may further include other data types, such as data from social media platforms, credit reports, etc.

The training data 114 may be reviewed and/or curated to ensure that appropriate and relevant information is used for training the models 112. Doing so may maintain the quality and reliability of the responses generated by the chatbot. In some embodiments, the model configuration 120 may include a plurality of intents, which may be predefined categories of user queries that the chatbot (implemented via the models 112 and/or AI assistant application 110) is permitted to understand and respond to. Furthermore, the model configuration 120 may include guardrails that may define the boundaries of what the AI chatbot can and cannot discuss. These guardrails may ensure that the responses generated by the AI chatbot are accurate, appropriate, and compliant with legal and regulatory standards. More generally, the model configuration 120 may include a plurality of decision trees (where a given set of resources in the resources 122 may be associated with a respective decision tree), a plurality of approved topics (or concepts), restricted topics, approved data types, restricted data types (e.g., sensitive information), approved responses, and/or restricted responses.

The models 112 (e.g., the AI chatbot) are then trained using the training data 114 and/or the model configuration 120 (e.g., decision trees, intents, guardrails, etc.) with adjustments made to the parameters of the models 112 to improve their performance. In some embodiments, the training process includes practice generations of prompts to fine-tune the ability of the models 112 to interpret user queries and generate relevant responses. In some embodiments, the training of the models 112 includes practice generations of decision tree-based prompts to fine-tune the performance.

In some embodiments, confidence scores, which indicate the certainty of the models 112 in their responses, are tweaked to ensure that the models 112 can accurately interpret user queries and provide reliable answers. This helps in determining the intent behind user queries more effectively. More generally, the models 112 may undergo continuous improvement based on feedback and new data.

This may include retraining the models 112 with additional information and refining the decision trees, guardrails, and/or intents as needed.

When the models 112 are trained, the models 112 may be integrated as AI chatbots into the AI assistant application 110, where the models 112 can receive natural language questions and generate natural language responses. The models 112 may use confidence scores to determine the reliability of generated responses, ensuring accurate interpretation of user queries and returning appropriate answers. Similarly, the trained models 112 may implement product selector tools based on decision tree logic.

When a user accesses a web page 118 using the web browser 116, the AI assistant application 110 may process the content of the web page 118 using the models 112 to determine one or more resources 122 associated with the web page 118. The AI assistant application 110 and/or models 112 may further process the content of the web page 118 (e.g., text, images, etc.) to extract one or more topics, attributes, and/or features from the web page 118. The AI assistant application 110 may then generate a recommendation to use a product selector. The product selector may include a plurality of prompts and/or questions. The AI assistant application 110 and/or the models 112 may generate the product selector based on one or more decision trees in the model configuration 120. In some embodiments, the AI assistant application 110 and/or the models 112 accesses a pre-generated product selector in the model configuration 120.

The user may complete the questions of the product selector, with each response guiding the AI assistant application 110 and/or models 112 to generate the next question. For example, if the user indicates, for a first question in a credit card product selector, they have a high credit score, the AI assistant application 110 may identify follow-up questions associated with applicants having high credit scores (and/or discard follow-up questions associated with applicants not having high credit scores). The AI assistant application 110 may generally guide the user through the product selector, ultimately generating a final decision including one of the plurality of resources 122.

As stated, the account data 124 includes data for a plurality of account holders. The account data 124 may include personal information such as the name, contact information, date of birth, unique account numbers, types of accounts (e.g., checking, savings, credit cards), current balances, detailed transaction histories, income, expense patterns, credit scores, and linked services (e.g., connected external accounts, stored payment methods, etc.). However, in some embodiments, the AI assistant application 110 the users of the user devices 104 do not have accounts in the account data 124. Advantageously, therefore, the AI assistant application 110 is publicly available to all users.

More generally, when a user submits a natural language question to the AI assistant application 110, the AI assistant application 110 may processes the query using the trained model 112 (and/or models 112) to interpret the user's intent and extract relevant information. For example, the AI assistant application 110 and/or models 112 may extract one or more topics, attributes, and/or features from the question. The model 112 then generates a response based on the interpreted intent and the extracted information, ensuring that the response is accurate and relevant to the user's query. This process allows the model 112 to provide real-time information and assistance, enhancing user engagement and accessibility. By leveraging advanced AI technologies and innovative training methods, the AI assistant application 110 and/or the models 112 may deliver a reliable and user-friendly experience. Embodiments are not limited in these contexts.

In one embodiment, when a user decides to enroll in a mobile banking program, the user downloads or otherwise obtains the mobile banking system client application from a mobile banking system, for example enterprise system 100, or from a distinct application server. In other embodiments, the user interacts with a mobile banking system via a web browser application in addition to, or instead of, the mobile P2P payment system client application.

The network 106 may also incorporate various cloud-based deployment models including private cloud (e.g., an organization-based cloud managed by either the organization or third parties and hosted on-premises or off premises), public cloud (e.g., cloud-based infrastructure available to the general public that is owned by an organization that sells cloud services), community cloud (e.g., cloud-based infrastructure shared by several organizations and manages by the organizations or third parties and hosted on-premises or off premises), and/or hybrid cloud (e.g., composed of two or more clouds e.g., private community, and/or public).

The user devices 104 may include automatic teller machines (ATMs) utilized by the system 100 in serving users. In another example, the servers 102 represent payment clearinghouse or payment rail systems for processing payment transactions, and in another example, the servers 102 such as merchant systems or banking systems configured to interact with the user devices 104 during transactions and also configured to interact with the enterprise system 100 in back-end transactions clearing processes.

The user devices 104 may also be configured to obtain and process various forms of authentication via an authentication system to obtain authentication information of a user. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

System 100 as illustrated diagrammatically represents at least one example of a possible implementation, where alternatives, additions, and modifications are possible for performing some or all of the described methods, operations, and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The system 100 can offer any number or type of services and products to one or more users. In some examples, an enterprise system 100 offers products. In some examples, an enterprise system 100 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 100, automated assistance may be provided by the enterprise system 100. For example, automated access to user accounts and replies to inquiries may be provided by enterprise-side automated voice, text, and graphical display communications and interactions. In at least some examples, any number of human agents, can be employed, utilized, authorized, or referred by the enterprise system 100. Such human agents can be, as non-limiting examples, point of sale or point of service (POS) representatives, online customer service assistants available to users, advisors, managers, sales team members, and referral agents ready to route user requests and communications to preferred or particular other agents, human or virtual.

Human agents may utilize agent devices (e.g., user devices 104) to serve users in their interactions to communicate and take action. In such embodiments, the user devices 104 can be, as non-limiting examples, computing devices, kiosks, terminals, smart devices such as phones, and devices and tools at customer service counters and windows at POS locations.

FIG. 2A illustrates an example graphical user interface, according to one embodiment. As shown, a web browser 116 may display a web page 118-1 that includes an AI chatbot provided by the AI assistant application 110 and/or models 112.

As shown, the web page 118-1 is associated with an example credit card offered by a financial institution. The AI assistant application 110 may analyze the web page 118-1 to determine that the web page 118-1 is associated with the credit card. Furthermore, the AI assistant application 110 may determine that multiple credit card types exist in the resources 122. Therefore, the AI assistant application 110 may provide tools to help the user select the most appropriate credit card for their particular needs.

For example, the user may ask a question about the credit card via input field 202. The AI assistant application 110 may use the models 112 to process the question and return a response to the question, e.g., with information associated with the credit card.

Furthermore, as shown, the AI assistant application 110 provides a selectable element 204, and a selectable element 206. The selectable element 204 may allow the user to access a web page 118 that provides a detailed comparison of each type of credit card in the resources 122. For example, the comparison may depict, for each card, annual fees, interest rates, credit limits, rewards, etc. The selectable element 206 may initiate a quiz (e.g., a product selector tool) that is based on a decision tree to help guide the user to an outcome, e.g., one of the credit card types.

FIG. 2B illustrates an embodiment where the user selects the selectable element 206 to access a product selector provided by the AI assistant application 110, according to one embodiment. As shown, the AI assistant application 110 outputs a first prompt 208, e.g., a question, with one or more selectable responses. As shown, the user has selected a response 210. The user may select selectable element 212 to submit the response 210 to the AI assistant application 110.

FIG. 2C illustrates an embodiment where the user selects the selectable element 212 of FIG. 2A. As shown, the AI assistant application 110 outputs a second prompt 214, which is based on the response 210 provided in FIG. 2A. For example, attributes of the selected response 210 may be compared to the attributes of various cards in the resources 122. The cards may be filtered to exclude those cards having attributes that do not match the attributes of the response 210. As shown, the AI assistant application 110 outputs a plurality of responses, of which the user selects response 216. The user may select selectable element 218 to submit the response 216 to the AI assistant application 110.

FIG. 2D illustrates an embodiment where the user selects the selectable element 218 of FIG. 2C. As shown, the AI assistant application 110 outputs a third prompt 220, which is based on the response 216 provided in FIG. 2B. For example, attributes of the selected response 216 may be compared to the attributes of the remaining cards being considered (e.g., those cards that were not previously filtered). The cards may further be filtered to exclude those cards having attributes that do not match the attributes of the response 216. Furthermore, the AI assistant application 110 outputs additional responses, of which the user selects response 222. The user may select submission element 224 to submit the response 222 to the AI assistant application 110.

FIG. 2E illustrates an embodiment where the user selects the submission element 224 of FIG. 2D. As shown, the AI assistant application 110 outputs a decision 226. The decision 226 indicates one of the resources 122, e.g., a particular type of credit card. The decision 226 may be based on the responses 210, 216, and 222. For example, attributes of the selected response 222 may be compared to the attributes of the remaining cards being considered (e.g., those cards that were not previously filtered). The cards may be filtered to exclude those cards having attributes that do not match the attributes of the response 222. In some embodiments, the filtering may leave a single card remaining, which is returned as the decision 226. In some embodiments, multiple cards may remain. In such embodiments, the AI assistant application 110 and/or the models 112 may compute a score for the remaining cards, and select the card with the highest score as the decision 226.

As shown, the AI assistant application 110 may output an image 228 of the card, a selectable element 230, a selectable element 232, and a selectable element 234. In some embodiments, the image 228 and selectable elements 230, 232, 234 are based on the metadata of the selected card in the resources 122. The selectable element 230 may be directed to a link (e.g., to one of the web pages 118) to an application for the credit card, e.g., to allow the user to apply for the credit card. The selectable element 232 may include a link to a web page 118 that has detailed information associated with the credit card. Selectable element 234 may include a link to initiate a chat communication session with a person, e.g., an employee of the financial institution offering the credit card.

In some embodiments, the AI assistant application 110 may provide further information. For example, the user may apply for the credit card via selectable element 230. The application may be approved, and an indication of the approval may be stored in the account data 124. Based on the approval, the AI assistant application 110 may provide additional information, such as setting up alerts, notifications, bill pay operations, etc., for the new account. Similarly, the AI assistant application 110 may output a branch or automated teller machine (ATM) finder, thereby allowing the user to find the nearest branch and/or ATM based on the location of the user device 104 and/or a location provided by the user to the AI assistant application 110. The AI assistant application 110 may then provide directions to a selected branch and/or ATM. In some embodiments, the AI assistant application 110 generates a link to another application (e.g., a maps application) which, when selected by the user, opens the another application with start and destination addresses included for navigation. Embodiments are not limited in these contexts. Embodiments are not limited in these contexts.

FIG. 3 illustrates an example logic flow 300. Although the example logic flow 300 depicts a particular sequence of operations, the sequence may be altered without departing from the scope of the present disclosure. For example, some of the operations depicted may be performed in parallel or in a different sequence that does not materially affect the function of the logic flow 300. In other examples, different components of an example device or system that implements the logic flow 300 may perform functions at substantially the same time or in a specific sequence.

According to some examples, the logic flow 300 includes receiving, by a processor from a client device, a request to access a web page at block 302. For example, the web server 108 illustrated in FIG. 1 may receive, from a client device such as user device 104, a request to access a web page. For example, the user may desire to visit a web page such as one of the web pages 118. The user may provide or otherwise input a link to the web page via the web browser 116, which may generate a request for the web page. The request may be an HTTP request.

According to some examples, the logic flow 300 includes providing, by the processor to the client device, the web page including an artificial intelligence (AI) chatbot at block 304. For example, the web server 108 may provide, to the web browser 116, the web page from the web pages 118. The web page provided to the web browser may include an instance of the AI assistant application 110 (which may include one or more models 112) as the AI chatbot.

According to some examples, the logic flow 300 includes determining, by the AI chatbot, a content of the web page at block 306. For example, the AI assistant application 110 may determine a content of the web page. For example, the AI assistant application 110 may analyze source code of the web page to extract content, concepts, topics, etc. In some embodiments, the AI assistant application 110 may determine the content of the web page is associated with one or more resources in the resources 122. For example, the content of the web page may be a product page associated with a product, service, credit card, debit card, an account type provided by a financial institution, etc.

According to some examples, the logic flow 300 includes outputting, by the AI chatbot, a plurality of prompts associated with the content at block 308. For example, the AI assistant application 110 may output a plurality of prompts associated with the content. The plurality of prompts may be outputted serially and collectively may form a product selector that is generated by the AI assistant application 110 based on one or more decision trees.

According to some examples, the logic flow 300 includes receiving, by the AI chatbot, a plurality of responses to the plurality of prompts at block 310. For example, the AI assistant application 110 may receive, from a user of user device 104, a plurality of responses to the plurality of prompts. The responses may be received serially, e.g., a respective response may be received for a respective one of the prompts. Advantageously, the AI assistant application 110 may select a second prompt based on a response to a first prompt. Stated differently, the responses provided by the user may influence the next prompt generated by the AI assistant application 110 and/or the models 112.

According to some examples, the logic flow 300 includes outputting, by the AI chatbot based on the plurality of responses, a decision comprising a first resource of a plurality of resources at block 312. For example, the AI assistant application 110 may output, based on the plurality of responses, a decision comprising a first resource of a plurality of resources. For example, the decision may specify one of the resources 122, e.g., a particular type of product, service, credit card, debit card, etc. Embodiments are not limited in these contexts.

As used herein, an artificial intelligence system, artificial intelligence agent, artificial intelligence algorithm, artificial intelligence module, program, and the like, generally refer to computer implemented programs that are suitable to simulate intelligent behavior (e.g., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to use various analytical tools (e.g., algorithmic applications) to leverage data to make predictions or decisions. Machine learning programs may be configured to implement various algorithmic processes and learning approaches including, for example, decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG, or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, to implement the stored processes and/or optimize the machine learning logic training and interface.

Machine learning models are trained using various data inputs and techniques. Example training methods may include, for example, supervised learning, (e.g., decision tree learning, support vector machines, similarity and metric learning, etc.), unsupervised learning, (e.g., association rule learning, clustering, etc.), reinforcement learning, semi-supervised learning, self-supervised learning, multi-instance learning, inductive learning, deductive inference, transductive learning, sparse dictionary learning and the like. Example clustering algorithms used in unsupervised learning may include, for example, k-means clustering, density based special clustering of applications with noise (DBSCAN), mean shift clustering, expectation maximization (EM) clustering using Gaussian mixture models (GMM), agglomerative hierarchical clustering, or the like. According to one embodiment, clustering of data may be performed using a cluster model to group data points based on certain similarities using unlabeled data. Example cluster models may include, for example, connectivity models, centroid models, distribution models, density models, group models, graph based models, neural models and the like.

One subfield of machine learning includes neural networks, which take inspiration from biological neural networks. In machine learning, a neural network includes interconnected units that process information by responding to external inputs to find connections and derive meaning from undefined data. A neural network can, in a sense, learn to perform tasks by interpreting numerical patterns that take the shape of vectors and by categorizing data based on similarities, without being programmed with any task-specific rules. A neural network generally includes connected units, neurons, or nodes (e.g., connected by synapses) and may allow for the machine learning program to improve performance. A neural network may define a network of functions, which have a graphical relationship. Various neural networks that implement machine learning exist including, for example, feedforward artificial neural networks, perceptron and multilayer perceptron neural networks, radial basis function artificial neural networks, recurrent artificial neural networks, modular neural networks, long short term memory networks, as well as various other neural networks.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between-1 and 1) may be used to modify the previous coefficient, e.g., a propagated value. The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An artificial neural network (ANN), also known as a feedforward network, may be utilized, e.g., an acyclic graph with nodes arranged in layers. A feedforward network (see, e.g., feedforward network 401 referenced in FIG. 4A) may include a topography with a hidden layer 403 between an input layer 402 and an output layer 404. The input layer 402, having nodes commonly referenced in FIG. 4A as input nodes 405 for convenience, communicates input data, variables, matrices, or the like to the hidden layer 403, having nodes 406. The hidden layer 403 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 405 of the input layer, which then communicates the data to the hidden layer 403. The hidden layer 403 may be configured to determine the state of the nodes in the respective layers and assign weight coefficients or parameters of the nodes based on the edges separating each of the layers, e.g., an activation function implemented between the input data communicated from the input layer 402 and the output data communicated to the nodes 407 of the output layer 404. It should be appreciated that the form of the output from the neural network may generally depend on the type of model represented by the algorithm. Although the feedforward network 401 of FIG. 4A expressly includes a single hidden layer 403, other embodiments of feedforward networks within the scope of the descriptions can include any number of hidden layers. The hidden layers are intermediate the input and output layers and are generally where all or most of the computation is done.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model. The models 112 and/or AI assistant application 110 may each include one or more of the neural networks, such as feedforward network 401, ANN, convolutional neural network 408, etc.

An exemplary convolutional neural network CNN is depicted and referenced as 408 in FIG. 4B. As in the feedforward network 401 of FIG. 4A, the illustrated example of FIG. 4B has an input layer 409 and an output layer 413. However where a single hidden layer 403 is represented in FIG. 4A, multiple consecutive hidden layers 410, 411, and 412 are represented in FIG. 4B. The edge neurons represented by white-filled arrows highlight that hidden layer nodes can be connected locally, such that not all nodes of succeeding layers are connected by neurons.

FIG. 4C, representing a portion of the convolutional neural network 408 of FIG. 4B, specifically portions of the input layer 409 and the first hidden layer 410, illustrates that connections can be weighted. In the illustrated example, labels W1 and W2 refer to respective assigned weights for the referenced connections. Two hidden nodes 414 and 415 share the same set of weights W1 and W2 when connecting to two local patches.

Weight defines the impact a node in any given layer has on computations by a connected node in the next layer. FIG. 5 represents a particular node 500 in a hidden layer. The node 500 is connected to several nodes in the previous layer representing inputs to the node 500. The input nodes 501, 502, 503 and 504 are each assigned a respective weight W01, W02, W03, and W04 in the computation at the node 500, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current computation of the parameter, e.g., at least a portion of the output data from the RNN may be used as feedback/input in computing subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

An example for a Recurrent Neural Network (RNN) is referenced as 600 in FIG. 6. As in the feedforward network 401 of FIG. 4A, the illustrated example of FIG. 6 has an input layer 610 (with nodes 612) and an output layer 640 (with nodes 642). However, where a single hidden layer 403 is represented in FIG. 4A, multiple consecutive hidden layers 620 and 630 are represented in FIG. 6 (with nodes 622 and nodes 632, respectively). As shown, the RNN 600 includes a feedback connector 604 configured to communicate parameter data from at least one node 632 from the second hidden layer 630 to at least one node 622 of the first hidden layer 620. It should be appreciated that two or more and up to all of the nodes of a subsequent layer may provide or communicate a parameter or other data to a previous layer of the RNN 600. Moreover and in some embodiments, the RNN 600 may include multiple feedback connectors 604 (e.g., connectors 604 suitable to communicatively couple pairs of nodes and/or feedback connectors 604 configured to provide communication between three or more nodes).

Additionally or alternatively, the feedback connector 604 may communicatively couple two or more nodes having at least one hidden layer between them, e.g., nodes of nonsequential layers of the RNN 600. The models 112 and/or AI assistant application 110 may each include one or more RNNs 600.

In an additional or alternative embodiment, the machine-learning program may include one or more support vector machines. A support vector machine may be configured to determine a category to which input data belongs. For example, the machine-learning program may be configured to define a margin using a combination of two or more of the input variables and/or data points as support vectors to maximize the determined margin. Such a margin may generally correspond to a distance between the closest vectors that are classified differently. The machine-learning program may be configured to utilize a plurality of support vector machines to perform a single classification. For example, the machine-learning program may determine the category to which input data belongs using a first support vector determined from first and second data points/variables, and the machine-learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine-learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine-learning program may include a relatively large number of layers, e.g., three or more layers, and may be referred to as deep neural networks. For example, the node of each hidden layer of a neural network may be associated with an activation function utilized by the machine-learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

According to various implementations, deep neural networks incorporate neurons, synapses, weights, biases, and functions and can be trained to model complex non-linear relationships. Various deep learning frameworks may include, for example, TensorFlow, MxNet, PyTorch, Keras, Gluon, and the like. Training a deep neural network may include complex input/output transformations and may include, according to various embodiments, a backpropagation algorithm. According to various embodiments, deep neural networks may be configured to classify images of handwritten digits from a dataset or various other images. According to various embodiments, the datasets may include a collection of files that are unstructured and lack predefined data model schema or organization. Unlike structured data, which is usually stored in a relational database (RDBMS) and can be mapped into designated fields, unstructured data comes in many formats that can be challenging to process and analyze. Examples of unstructured data may include, according to non-limiting examples, dates, numbers, facts, emails, text files, scientific data, satellite imagery, media files, social media data, text messages, mobile communication data, and the like.

Referring now to FIG. 7 and some embodiments, an artificial intelligence (AI) program 702 may include a front-end algorithm 704 and a back-end algorithm 706. The models 112 and/or AI assistant application 110 may each include one or more artificial intelligence programs 702. The artificial intelligence program 702 may be implemented on an AI processor 720, such as the processor 904 of computer 902 of FIG. 9, and/or a dedicated processing device (e.g., servers 102 and/or user devices 104). The instructions associated with the front-end algorithm 704 and the back-end algorithm 706 may be stored in an associated memory device and/or storage device of the system (e.g., memory 724 and/or storage 726 in FIG. 7), etc.) communicatively coupled to the AI processor 720, as shown. Additionally or alternatively, one or more memory devices and/or storage devices (e.g., storage medium 910 and/or memory 906 of FIG. 9, etc.) may be used for processing use and/or including one or more instructions necessary for operation of the AI program 702. In some embodiments, the AI program 702 may include a deep neural network (e.g., a front-end algorithm 704 configured to perform pre-processing, such as feature recognition, and a back-end algorithm 706 configured to perform an operation on the data set communicated directly or indirectly to the back-end algorithm 706). For instance, the front-end algorithm 704 can include at least one CNN 708 communicatively coupled to send output data to the back-end algorithm 706.

Additionally or alternatively, the front-end algorithm 704 can include one or more AI algorithms 710, 712 (e.g., statistical models or machine learning programs such as decision tree learning, associate rule learning, recurrent artificial neural networks, support vector machines, and the like). In various embodiments, the front-end algorithm 704 may be configured to include built in training and inference logic or suitable software to train the neural network prior to use (e.g., machine learning logic including, but not limited to, image recognition, mapping and localization, autonomous navigation, speech synthesis, document imaging, or language translation such as natural language processing). For example, a CNN 708 and/or AI algorithm 710 may be used for image recognition, input categorization, and/or support vector training. In some embodiments and within the front-end algorithm 704, an output from an AI algorithm 710 may be communicated to a CNN 708 or 709, which processes the data before communicating an output from the CNN 708, 709 and/or the front-end algorithm 704 to the back-end algorithm 706. In various embodiments, the back-end algorithm 706 may be configured to implement input and/or model classification, speech recognition, translation, and the like. For instance, the back-end algorithm 706 may include one or more CNNs (e.g., CNN 714) or dense networks (e.g., dense networks 716), as described herein.

For instance, and in some embodiments of the AI program 702, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end algorithm 704). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 702 may be trained using a semi-supervised learning process in which some but not all of the output data is known, e.g., a mix of labeled and unlabeled data having the same distribution.

In some embodiments, the AI program 702 may be accelerated via a machine learning framework 722 (e.g., hardware). The machine learning framework may include an index of operations, subroutines, and the like (primitives) typically implemented by AI and/or machine learning algorithms. Thus, the AI program 702 may be configured to utilize the primitives of the framework 722 to perform some or all of the computations required by the AI program 702. Primitives suitable for inclusion in the machine learning framework 722 include operations associated with training a convolutional neural network (e.g., pools), tensor convolutions, activation functions, algebraic subroutines and programs (e.g., matrix operations, vector operations), numerical method subroutines and programs, and the like.

It should be appreciated that the machine-learning program may include variations, adaptations, and alternatives suitable to perform the operations necessary for the system, and the present disclosure is equally applicable to such suitably configured machine learning and/or artificial intelligence programs, modules, etc. For instance, the machine-learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine-learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

FIG. 8 is a flow chart representing a logic flow 800, according to at least one embodiment, of model development and deployment by machine learning. The logic flow 800 represents at least one example of a machine learning workflow in which operations are implemented in a machine-learning project.

In block 802, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, block 802 can represent a starting point. However, with regard to continuing or improving an ongoing machine learning workflow, block 802 can represent an opportunity for further user input or oversight via a feedback loop. Such feedback may flow through a user, or in various embodiments, the method automatically provides feedback, retrains and redeploys the retrained model.

In block 804, data is received, collected, accessed, or otherwise acquired and entered as can be termed data ingestion. In block 806, the data ingested in block 804 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing block 806 is updated with newly ingested data, an updated model will be generated. Block 806 can include data validation, which focuses on confirming that the statistics of the ingested data are as expected, such as that data values are within expected numerical ranges, that data sets are within any expected or required categories, and that data comply with any needed distributions such as within those categories. Block 806 can proceed to block 808 to automatically alert the initiating user, other human or virtual agents, and/or other systems, if any anomalies are detected in the data, thereby pausing or terminating the process flow until corrective action is taken.

In block 810, training test data such as a target variable value is inserted into an iterative training and testing loop. In block 812, model training, a core step of the machine learning workflow, is implemented. A model architecture is trained in the iterative training and testing loop. For example, features in the training test data are used to train the model based on weights and iterative computations in which the target variable may be incorrectly predicted in an early iteration as determined by comparison in block 814, where the model is tested. Subsequent iterations of the model training, in block 812, may be conducted with updated weights in the computations.

During each iteration of the training and testing loop, the accuracy of the model may be evaluated. In one embodiment, the re-evaluation of the model can include comparing an output of the model with an actual target result or variable to determine the accuracy of the prediction. If the model is not satisfying a minimum threshold level of accuracy (e.g., the model is underfitted), the system may automatically determine that the threshold level of accuracy is not satisfied and may adjust the weights for a subsequent iteration of the training and testing loop. The weights may be iteratively adjusted during each iteration of the training and testing loop based on the comparison to the threshold level of accuracy. However, there is a balance for training the model to avoid overfitting when the model would not perform well on predictions of new data. Rather, the model is automatically trained to be well-fitted such that it satisfies a threshold level of accuracy without learning the noise in the data to the extent that the model would not apply to new data by preventing additional iterations of the training and testing once a maximum accuracy threshold value has been obtained. Thus, with each iteration of the training and testing loop, the accuracy of the model is improved and the iterative training and testing of the model provides an improvement to the performance of a computer and computing technology because the system may automatically determine how many iterations to perform so that the model is well-fitted by surpassing the minimum threshold level of accuracy while automatically stopping the iterative training and testing of the model before the maximum accuracy threshold is obtained. In some embodiments, the training and testing loop utilizes a backpropagation algorithm and a gradient descent algorithm. Gradient descent is an optimization algorithm used to minimize differentiable real-valued multivariate functions. Gradient descent is an optimization algorithm used to minimize differentiable real-valued multivariate functions. The gradient descent algorithm may be used to iteratively adjust model parameters using computed derivatives to minimize a loss function. Backpropagation may be used to compute the gradient of the error function with respect to the neural network's weights.

When compliance and/or success in the model testing in block 814 is achieved, process flow proceeds to block 816, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

As discussed above, oversight of a deployed machine learning model may be automatically performed via a feedback loop whereby the method assesses performance of the deployed model (see block 816) and the feedback loop automatically provides feedback for further training of the machine learning model to improve its performance, and upon completion of the other method blocks such as block 812, the machine learning model that has been automatically retrained based on the feedback loop is then redeployed (block 814). In some embodiments, the system is continually receiving training data as new predictions are made and more data is collected. The continuous training data may be discretized to generate input data to retrain the model. Discretization methods can convert continuous data to discrete data by binning, clustering, and numerical discretization. The model may monitor incoming data sets to make predictions. When predictions are made the system analyzes the predictions to determine whether the model needs to be retrained.

In some embodiments, the model may detect anomalies in the predictions. Anomaly detection can provide a benefit by identifying instances of the prediction that deviate from expected data or a general pattern. A difficulty in anomaly detection is that the system must define the boundary between ordinary data and anomalous data to accurately classify the data as ordinary or anomalous. The line between ordinary and anomalous may be difficult to determine with cases approaching a boundary and based on the specific application. For example, small variations may trigger an identification of an anomaly in the data while relatively larger deviations may be considered normal in less sensitive applications. The disclosed systems and methods may provide solutions for detecting anomalies to more accurately and quickly determine whether a model needs to be retrained. If data would be inapplicable or would corrupt the model by reducing the quality of the input data or training process (e.g., due to missing values, outliers, inconsistent formatting, incorrect labels, noisy data, etc.) that data may be automatically dropped and the source of that data may be blocked from providing data that would be used to train the model. This reflects an improvement in the process of training and deploying a model that is accurate and specific to the type of prediction sought. In particular, this provides an improvement in the field of model training, which provides a practical application.

In other applications, the anomaly detections processes described herein may be used to provide enhanced security to the overall computing system by detecting malicious attacks on network security. For example, the system may take proactive measures to remediate danger by detecting the source address associated with potentially malicious packets and dropping potentially malicious packets. This provides an improvement in network security by dropping potentially malicious packets and blocking future traffic from the source address of the potentially malicious source address.

The systems and methods disclosed herein may also be used to analyze text to form the predictions. In particular, the systems and methods described herein include a combination of elements that are utilized in a specific manner for automatically performing automated processes based on technological efficiency, which provides a specific improvement over prior art systems resulting in improved computer processing for faster automated processing functions. For example, the systems and method may apply robotic process automation for digital transformation of the data based on specific criteria to interpret text and unstructured data using text processing software techniques. The interpretation of the text may be implemented using the models described herein including unsupervised learning techniques or supervised learning techniques. The processor may track how much memory and/or processing time has been allocated to perform a function and the system may be trained to automatically detect and identify processes eligible for increased efficiencies based on existing inefficiencies in the process.

For example, the machine learning models may use unsupervised learning to identify and characterize hidden structures of unstructured and unlabeled content data, or supervised techniques that operate on labeled content data and include instructions informing the system which outputs are related to specific input values. In such instances, software processing can rely on iterative training techniques and training data to configure neural networks with an understanding of individual words, phrases, subjects, sentiments, and parts of speech.

Supervised learning software systems are trained using content data that is labeled or "tagged." During training, the supervised software systems learn the best mapping function between a known data input and expected known output (e.g., labeled or tagged content data). Supervised natural language processing software then uses the best approximating mapping learned during training to analyze unforeseen input data (never seen before) to accurately predict the corresponding output. Supervised learning software systems often require extensive and iterative optimization cycles to adjust the input-output mapping until they converge to an expected and well-accepted level of performance, such as an acceptable threshold error rate between a computed probability and a desired threshold probability.

The software systems are supervised because the way of learning from training data mimics the same process of a teacher supervising the end-to-end learning process. Supervised learning software systems are typically capable of achieving excellent levels of performance, but this excellent level of performance requires labeled data to be available. Developing, scaling, deploying, and maintaining accurate supervised learning software systems can take significant time, resources, and technical expertise from a team of skilled data scientists. Moreover, precision of the systems is dependent on the availability of labeled content data for training that is comparable to the corpus of content data that the system will process in a production environment.

Supervised learning software systems implement techniques that include, without limitation, Latent Semantic Analysis ("LSA"), Probabilistic Latent Semantic Analysis ("PLSA"), Latent Dirichlet Allocation ("LDA"), and more recent Bidirectional Encoder Representations from Transformers ("BERT"). Latent Semantic Analysis software processing techniques process a corporate of content data files to ascertain statistical co-occurrences of words that appear together, which then give insights into the subjects of those words and documents.

Unsupervised learning software systems can perform training operations on unlabeled data and less requirement for time and expertise from trained data scientists. Unsupervised learning software systems can be designed with integrated intelligence and automation to automatically discover information, structure, and patterns from content data. Unsupervised learning software systems can be implemented with clustering software techniques that include, without limitation, K-means clustering, Mean-Shift clustering, Density-based clustering, Spectral clustering, Principal Component Analysis, and Neural Topic Modeling ("NTM").

Clustering software techniques can automatically group semantically similar words together to accelerate the derivation and verification of an underneath common intent—e.g., ascertain or derive a new classification or subject, and not just classification into an existing subject or classification. Unsupervised learning software systems are also used for association rules mining to discover relationships between features from content data.

The content driver software service utilizes one or more supervised or unsupervised software processing techniques to perform a subject classification analysis to generate subject data. Suitable software processing techniques can include, without limitation, Latent Semantic Analysis, Probabilistic Latent Semantic Analysis, Latent Dirichlet Allocation. Latent Semantic Analysis software processing techniques generally process a corpus of alphanumeric text files, or documents, to ascertain statistical co-occurrences of words that appear together, which then give insights into the subjects of those words and documents. The content driver software service can utilize software processing techniques that include Non-Matrix Factorization, Correlated Topic Model ("CTM"), and K-Means or other types of clustering.

Neural networks may be trained using training set content data that comprise sample tokens, phrases, sentences, paragraphs, or documents for which desired subjects, content sources, interrogatories, or sentiment values are known. A labeling analysis may be performed on the training set content data to annotate the data with known subject labels, interrogatory labels, content source labels, or sentiment labels, thereby generating annotated training set content data. For example, a person can utilize a labeling software application to review training set content data to identify and tag or "annotate" various parts of speech, subjects, interrogatories, content sources, and sentiments.

The training set content data may then be fed to the content driver software service neural networks to identify subjects, content sources, or sentiments and the corresponding probabilities. For example, the analysis might identify that particular text represents a question with a 35% probability. If the annotations indicate the text is, in fact, a question, an error rate can be taken to be 65% or the difference between the computed probability and the known certainty. Then parameters to the neural network are adjusted (e.g., constants and formulas that implement the nodes and connections between node), to increase the probability from 35% to ensure the neural network produces more accurate results, thereby reducing the error rate. The process is run iteratively on different sets of training set content data to continue to increase the accuracy of the neural network.

The content data is first pre-processes using a reduction analysis to create reduced content data. The reduction analysis first performs a qualification operation that removes unqualified content data that does not meaningfully contribute to the subject classification analysis. The qualification operation removes certain content data according to criteria defined by a provider. For instance, the qualification analysis can determine whether content data files are "empty" and contain no recorded linguistic interaction between a provider agent and a user and designate such empty files as not suitable for use in a subject classification analysis. As another example, the qualification analysis can designate files below a certain size or having a shared experience duration below a given threshold (e.g., less than one minute) as also being unsuitable for use in the subject classification analysis.

The reduction analysis can also perform a contradiction operation to remove contradictions and punctuations from the content data. Contradictions and punctuation include removing or replacing abbreviated words or phrases that can cause inaccuracies in a subject classification analysis. Examples include removing or replacing the abbreviations "min" for minute, "u" for you, and "wanna" for "want to," as well as apparent misspellings, such as "mssed" for the word missed. In some embodiments, the contradictions can be replaced according to a standard library of known abbreviations, such as replacing the acronym "brb" with the phrase "be right back." The contradiction operation can also remove or replace contractions, such as replacing "we're" with "we are."

The reduction analysis can also streamline the content data by performing one or more of the following operations, including: (i) tokenization to transform the content data into a collection of words or key phrases having punctuation and capitalization removed; (ii) stop word removal where short, common words or phrases such as "the" or "is" are removed; (iii) lemmatization where words are transformed into a base form, like changing third person words to first person and changing past tense words to present tense; (iv) stemming to reduce words to a root form, such as changing plural to singular; and (v) hyponymy and hypernym replacement where certain words are replaced with words having a similar meaning so as to reduce the variation of words within the content data.

Following a reduction analysis, the reduced content data is vectorized to map the alphanumeric text into a vector form. One approach to vectorizing content data includes applying "bag-of-words" modeling. The bag-of-words approach counts the number of times a particular word appears in content data to convert the words into a numerical value. The bag-of-words model can include parameters, such as setting a threshold on the number of times a word must appear to be included in the vectors.

Techniques to encode the context communication elements (e.g., such as words, speech patterns, tone, timbre, cadence, etc.) may, in part, determine how often communication elements appear together. Determining the adjacent pairing of communication elements can be achieved by creating a co-occurrence matrix with the value of each member of the matrix counting how frequently one communication element coincides with another, either just before or just after it. That is, the words or communication elements form the row and column labels of a matrix, and a numeric value appears in matrix elements that correspond to a row and column label for communication elements that appear adjacent in the content data.

As an alternative to counting communication elements (e.g., words) in a corpus of content data and turning it into a co-occurrence matrix, another software processing technique may be used where a communication element in the content data corpus predicts the next communication element. Looking through a corpus, counts may be generated for adjacent communication elements, and the counts are converted from frequencies into probabilities (e.g., using n-gram predictions with Kneser-Ney smoothing) using a simple neural network. Suitable neural network architectures for such purpose include a skip-gram architecture. The neural network may be trained by feeding through a large corpus of content data, and embedded middle layers in the neural network are adjusted to best predict the next word.

The predictive processing creates weight matrices that densely carry contextual, and hence semantic, information from the selected corpus of content data. Pre-trained, contextualized content data embedding can have high dimensionality. To reduce the dimensionality, a uniform manifold approximation and projection algorithm ("UMAP") can be applied to reduce dimensionality while maintaining essential information.

Prior to conducting a subject analysis to ascertain subject identifiers in the content data (e.g., topics or subjects addressed in the content data) or interaction driver identifiers in the content data (e.g., reasons why the customer initiated the interaction with the provider, such as the reason underlying a support request), the system can perform a concentration analysis on the content data. The concentration analysis concentrates, or increases the density of, the content data by identifying and retaining communication elements that have significant weight in the subject analysis and discarding or ignoring communication elements that have relativity little weight.

In one embodiment, the concentration analysis includes executing a term frequency-inverse document frequency ("tf-idf") software processing technique to determine the frequency or corresponding weight quantifier for communication elements with the content data. The weight quantifiers are compared against a pre-determined weight threshold to generate concentrated content data that is made up of communication elements having weight quantifiers above the weight threshold.

The concentrated content data is processed using a subject classification analysis to determine subject identifiers (e.g., topics) addressed within the content data. The subject classification analysis can specifically identify one or more interaction driver identifiers that are the reason why a user initiated a shared experience or support service request. An interaction driver identifier can be determined by, for example, first determining the subject identifiers having the highest weight quantifiers (e.g., frequencies or probabilities) and comparing such subject identifiers against a database of known interaction driver identifiers.

In one embodiment, the subject classification analysis is performed on the content data using a Latent Dirichlet Allocation analysis to identify subject data that includes one or more subject identifiers (e.g., topics addressed in the underlying content data). Performing the LDA analysis on the reduced content data may include transforming the content data into an array of text data representing key words or phrases that represent a subject (e.g., a bag-of-words array) and determining the one or more subjects through analysis of the array. Each cell in the array can represent the probability that given text data relates to a subject. A subject is then represented by a specified number of words or phrases having the highest probabilities (e.g., the words with the five highest probabilities), or the subject is represented by text data having probabilities above a predetermined subject probability threshold.

Clustering software processing techniques include K-means clustering, which is an unsupervised processing technique that does not utilized labeled content data. Clusters are defined by "K" number of centroids where each centroid is a point that represents the center of a cluster. The K-means processing technique run in an iterative fashion where each centroid is initially placed randomly in the vector space of the dataset, and the centroid moves to the center of the points that is closest to the centroid. In each new iteration, the distance between each centroid and the points are recomputed, and the centroid moves again to the center of the closest points. The processing completes when the position or the groups no longer change or when the distance in which the centroids change does not surpass a pre-defined threshold.

The clustering analysis yields a group of words or communication elements associated with each cluster, which can be referred to as subject vectors. Subjects may each include one or more subject vectors where each subject vector includes one or more identified communication elements (e.g., keywords, phrases, symbols, etc.) within the content data as well as a frequency of the one or more communication elements within the content data. The content driver software service can be configured to perform an additional concentration analysis following the clustering analysis that selects a pre-defined number of communication elements from each cluster to generate a descriptor set, such as the five or ten words having the highest weights in terms of frequency of appearance (or in terms of the probability that the words or phrases represent the true subject when neural networking architecture is used). In one embodiment, the descriptor sets were analyzed to determine if the reasons driving a customer support request were identified by the descriptor set subject identifiers.

The software model may be evaluated according to three categories, including a "good match" where the support request reason(s) are identified by the top words in the subject vector (e.g., the words with the highest weight or frequency), a "moderate" match where the support request reason(s) are identified by the second tier of words in the subject vector (e.g., words six to ten), and a "poor" match where, for instance, the top words in a subject vector do not match or identify the reasons the support request was initiated.

Alternatively, instead of selecting a pre-determined number of communication elements, post-clustering concentration analysis can analyze the subject vectors to identify communication elements that are included in several subject vectors having a weight quantifier (e.g., a frequency) below a specified weight threshold level that are then removed from the subject vectors. In this manner, the subject vectors are refined to exclude content data less likely to be related to a given subject. To reduce an effect of spam, the subject vectors may be analyzed, such that if one subject vector is determined to include communication elements that are rarely used in other subject vectors, then the communication elements are marked as having a poor subject correlation and is removed from the subject vector.

In another embodiment, the concentration analysis is performed on unclassified content data by mapping the communication elements within the content data to integer values. The content data is thus turned into a bag-of-words that includes integer values and the number of times the integers occur in content data. The bag-of-words is turned into a unit vector, where all the occurrences are normalized to the overall length. The unit vector may be compared to other subject vectors produced from an analysis of content data by taking the dot product of the two-unit vectors. All the dot products for all vectors in a given subject are added together to provide a weighting quantifier or score for the given subject identifier, which is taken as subject weighting data. A similar analysis can be performed on vectors created through other processing, such as K-means clustering or techniques that generate vectors where each word in the vector is replaced with a probability that the word represents a subject identifier or request driver data.

To illustrate generating subject weighting data, for any given subject there may be numerous subject vectors. Assume that for most of subject vectors, the dot product will be close to zero—even if the given content data addresses the subject at issue. Since there are some subjects with numerous subject vectors, there may be numerous small dot products that are added together to provide a significant score. Put another way, the particular subject is addressed consistently throughout a document, several documents, sessions of the content data, and the recurrence of the carries significant weight.

In another embodiment, a predetermined threshold may be applied where any dot product that has a value less than the threshold is ignored and only stronger dot products above the threshold are summed for the score. In another embodiment, this threshold may be empirically verified against a training data set to provide a more accurate subject analysis.

In another example, a number of subject identifiers may be substantially different, with some subjects having orders of magnitude fewer subject vectors than do other subjects. The weight scoring might significantly favor relatively unimportant subjects that occur frequently in the content data. To address this problem, a linear scaling on the dot product scoring based on the number of subject vectors may be applied. The result provides a correction to the score so that important but less common subjects are weighed more heavily.

Once all scores are computed for all subjects, then subjects may be sorted, and the most probable subjects are returned. The resulting output provides an array of subjects and strengths. In another embodiment, hashes may be used to store the subject vectors to provide a simple lookup of text data (e.g., words and phrases) and strengths. The one or more subject vectors can be represented by hashes of words and strengths, or alternatively an ordered byte stream (e.g., an ordered byte stream of 4-byte integers, etc.) with another array of strengths (e.g., 4-byte floating-point strengths, etc.).

The content driver software service can also use term frequency-inverse document frequency software processing techniques to vectorize the content data and generating weighting data that weight words or particular subjects. The tf-idf is represented by a statistical value that increases proportionally to the number of times a word appears in the content data. This frequency is offset by the number of separate content data instances that contain the word, which adjusts for the fact that some words appear more frequently in general across multiple shared experiences or content data files. The result is a weight in favor of words or terms more likely to be important within the content data, which in turn can be used to weigh some subjects more heavily in importance than others. To illustrate with a simplified example, the tf-idf might indicate that the term "password" carries significant weight within content data. To the extent any of the subjects identified by a natural language processing analysis include the term "password," that subject can be assigned more weight by the content driver software service.

The content data can be visualized and subject to a reduction into two-dimensional data using a UMAP to generate a cluster graph visualizing a plurality of clusters. The content driver software service feeds the two-dimensional data into a DBSCAN and identify a center of each cluster of the plurality of clusters. The process may, using the two dimensional data from the UMAP and the center of each cluster from the DBSCAN, apply a KNN to identify data points closest to the center of each cluster and shade each of the data points to graphically identify each cluster of the plurality of clusters. The processor may illustrate a graph on the display representative of the data points that are shaded following application of the KNN.

The content driver software service can also incorporate Part of Speech ("POS") tagging software code that assigns words a part of speech depending upon the neighboring words, such as tagging words as a noun, pronoun, verb, adverb, adjective, conjunction, preposition, or other relevant parts of speech. The content driver software service can utilize the POS tagged words to help identify questions and subjects according to pre-defined rules, such as recognizing that the word "what" followed by a verb is also more likely to be a question than the word "what" followed by a preposition or pronoun (e.g., "What is this?" versus "What he wants is an answer.").

POS tagging in conjunction with Named Entity Recognition ("NER") software processing techniques can be used by the content driver software service to identify various content sources within the content data. NER techniques are utilized to classify a given word into a category, such as a person, product, organization, or location. Using POS and NER techniques to process the content data allow the content driver software service to identify particular words and text as a noun and as representing a person participating in the discussion (e.g., a content source).

In instances where audio signals are being interpretated from audio files, video files, continual audio inputs (e.g., via a microphone), the system may apply binary time-frequency masks to separate signals from multiple sources by using a binary matrix to indicate which portions of a representation should be turned on or off. A binary mask includes a matrix of binary values that correspond to sources such that it is multiplied with a spectrogram to include or exclude portions of the audio. The binary time-frequency mask for each speaker or audio source is obtained using clustering that assigns the number "1" to all time-frequency bins corresponding to the respective speaker and assigning the number "0" to the remaining time-frequency bins. Inverse short time Fourier transform (STFT) may convert the obtained separated signals into a time domain for multiple downstream applications. Speech waveforms may be synthesized from the masked clusters where each waveform corresponds to a different source of the audio. Further, the speech waveforms may be combined to generate a mixed speech signal by stitching together the speech waveforms corresponding to the different sources. Advantageously, this process can be used to remove certain voices or background conversations from a recording where there are multiple sources of audio. Synthesizing speech waveforms from a cluster of numbers is not a process that can be practically performed in the human mind. By combining speech waveforms to generate a mixed speech signal by stitching together speech waveforms corresponding to different sources and excluding the sources that are undesired as either being undesired voices or background conversations. Advantageously, this can be used to isolate a desired source of audio as part of computer-based separation techniques to distinguish audio from different users. This can help the system accurately interpret the most relevant information to perform further analysis on the speech of the desired source of the audio.

The systems and methods disclosed herein may utilize deployed models 112 and/or AI assistant application 110 (e.g., machine learning models, large language models, neural networks, predictive models, etc.) to make predictions about user queries. The use of specially trained models realizes a number of improvements over traditional methods of processing user queries, including more accurate responses to user queries, which may include more accurate predictions of products for specific users. Further, the systems and methods disclosed herein lead to faster training times and a more accurate model.

The systems and methods disclosed herein reflect an improvement in the functioning of a computer or an improvement to other technology or a technical field by leveraging data ingestion and curation to ensure that only relevant and appropriate information is used for training the models 112 and/or when the models 112 generate responses to queries, including accurate predictions of products in selection tools, based on the training.

In addition, the systems and methods utilize a particular machine or manufacture such as, for example, servers 102 and/or user devices 104. The servers 102 and/or user devices 104 are integral to effectuating the improvements disclosed herein by training and/or deploying trained models 112, including via the AI assistant application 110. Further, the systems and methods disclosed herein utilize a combination of software and hardware that include, for example, a physical circuit, which is a machine or manufacture.

FIG. 9 illustrates an example computing system 900 suitable for implementing various embodiments as described herein. As shown, the computing system 900 comprises a computer 902, which is representative of any type of physical and/or virtualized computing device. Examples of the computer 902 include, but are not limited to, a server, workstation, laptop, mobile device, smartphone, tablet computer, mainframe, distributed computing system, compute cluster, media device, camera, gaming device, a portable digital assistant (PDA), a system-on-chip (SoC), a pager, a television, a wearable device, a virtual machine (VM), container, or any other device with processing capabilities. In one embodiment, the computer 902 is representative of some or all of the components of the system 100, including the servers 102 and/or user devices 104. More generally, the computing system 900 is configured to implement all systems, methods, apparatuses, media, and embodiments disclosed herein.

As shown, the computer 902 includes one or more processors 904, one or more memories 906, one or more non-transitory storage media 910, one or more communications interfaces 912, one or more positioning devices 914, one or more input devices 916, and one or more output devices 918 communicably coupled via an interconnect 908. A power source 920, such as a power supply, battery, or any type of power source may provide power to the computer 902.

The processor 904 is representative of any type of processing circuit. For example, the processor 904 may be a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, a digital signal processor, analog to digital converter, digital to analog converter, and the like.

The memory 906 is representative of any computer readable medium to store data, code, or other information. The memory 906 may include volatile memory, such as volatile Random Access Memory (RAM) including a cache area for the temporary storage of data. The memory 906 may also include non-volatile memory, which can be embedded and/or may be removable. The non-volatile memory can additionally or alternatively include an electrically erasable programmable read-only memory (EEPROM), flash memory or the like. The storage medium 910 is representative of any type of computer readable medium to store data, code, or other information. Examples of storage media 910 include solid state drives, hard drives, Redundant Array of Independent Disks (RAID) drives, memory pools, universal serial bus (USB) storage devices, and the like.

The memory 906 and storage medium 910 can store any number and type of computer-executable instructions executed by the processor 904 to implement the functions described herein. For example, the memory 906 and/or storage medium 910 may store the AI assistant application 110, web pages 118, web browser 116, models 112, model configuration 120, training data 114, resources 122, and/or account data 124. As another example, the memory 906 may include such applications as web browser 116 and/or a mobile P2P payment system client application. These applications also typically provide a graphical user interface (GUI) on a display that allows the user to communicate with the computer 902, and, for example a mobile banking system, and/or other devices or systems. In one embodiment, when the user decides to enroll in a mobile banking program, the user downloads or otherwise obtains the mobile banking system client application from a mobile banking system, or from a distinct application server. In other embodiments, the user interacts with a mobile banking system via a web browser application in addition to, or instead of, the mobile P2P payment system client application. Similarly, the memory 906 and/or storage medium 910 may be used to store data such as cached data, files for user accounts, user profiles, account balances, transaction histories, files downloaded or received from other devices, and any other data items.

The interconnect 908 is representative of any type of circuitry to connect the components of the computer 902. For example, the interconnect 908 can include or represent, a system bus, a USB interface, a peripheral component interconnect (PCI), a Peripheral Component Interconnect-enhanced (PCIe), compute express link (CXL) interconnects, Universal Chiplet Interconnect Express (UCIe) interface, PCI-UCIe interconnects, an interface serial peripheral interconnects (SPIs), integrated interconnects (I2Cs), a high-speed interface connecting the processor 904 to the memory 906, individual electrical connections among the components, and electrical conductive traces on a motherboard common to some or all of the above-described components of the computer 902. As discussed herein, the interconnect 908 may operatively couple various components with one another, or in other words, electrically connects those components, either directly or indirectly—by way of intermediate component(s)—with one another.

The one or more input devices 916 are representative of any type of input device for receiving input, such as a keypad, keyboard, touchscreen, touchpad, microphone, camera, fingerprint sensor, mouse, joystick, other pointer device, button, soft key, and the like. The one or more output devices 918 are representative of any type of device for outputting information, such as a monitor, speaker, haptic feedback module, printer, and the like.

The computer 902 may use the communications interface 912 to communicate with one or more other devices 924 via a network 922. The communications interface 912 allows the computer 902 to communicate with and conduct transactions with other devices and systems, such as the other devices 924. The communications interface 912 may be a wired and/or a wireless interface. Communications may be conducted via various modes or protocols, of which Global System for Mobile Communications (GSM) voice calls, Short Message Service (SMS), Enhanced Messaging Service (EMS), Multimedia Messaging Service (MMS) messaging, Time Division Multiple Access (TDMA), Code Division Multiple Access (CDMA), Personal Digital Cellular (PDC), Wideband Code Division Multiple Access (WCDMA), CDMA2000, and General Packet Radio Service (GPRS), are all non-limiting and non-exclusive examples. Thus, communications can be conducted, for example, via the wireless communications interface 912, which can be or include a radio-frequency transceiver, a Bluetooth device, Wi-Fi device, a Near-Field Communication (NFC) device, and other wireless transceivers. In addition, a positioning device 914 such as a Global Positioning System (GPS) device may be included for navigation and location-related data exchanges, ingoing and/or outgoing.

Wi-Fi networks use radio technologies such as the Institute of Electrical and Electronics Engineers (IEEE) 802.11x (a, b, g, n, ac, ax, etc.) to provide secure, reliable, fast wireless connectivity. A Wi-Fi network connects computers to each other, to the Internet, and to wired networks (which use IEEE 802.3-related media and functions). A Wi-Fi network connects computers to each other, to the Internet, and to wired networks (which use IEEE 802.3-related media and functions). Communications may also and/or alternatively be conducted via wired connections using the communications interface 912, e.g., using USB, Ethernet, and other physically connected modes of data transfer. The network 922 may be any one of, or the combination of, wired and/or wireless networks including without limitation a direct connection, a private network (e.g., an intranet), a public network (e.g., the Internet), a Personal Area Network (PAN), a Local Area Network (LAN), a Wide Area Network (WAN), a wireless network, a cellular network, and other communications networks.

The computer 902 is configured to use the communications interface 912 as, for example, a network interface to communicate with one or more other devices on a network such as network 922. In this regard, the computer 902 utilizes the wireless communications interface 912 as an antenna operatively coupled to a transmitter and a receiver (together a "transceiver") included with the communications interface 912. The communications interface 912 is configured to provide signals to and receive signals from the transmitter and receiver, respectively. The signals may include signaling information in accordance with the air interface standard of the applicable cellular system of a wireless telephone network. In this regard, the computer 902 may be configured to operate with one or more air interface standards, communication protocols, modulation types, and access types. By way of illustration, the computer 902 may be configured to operate in accordance with any of a number of first, second, third, fourth, fifth-generation communication protocols and/or the like. For example, the as a smartphone, the computer 902 be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The computer 902 may also be configured to operate in accordance with non-cellular communication mechanisms, such as via a wireless local area network (WLAN) or other communication/data networks.

The communications interface 912 may also include a payment network interface. The payment network interface may include software, such as encryption software, and hardware, such as a modem, for communicating information to and/or from one or more devices on a network. For example, the computer 902 may be configured so that it can be used as a credit or debit card by, for example, wirelessly communicating account numbers or other authentication information to a terminal of the network. Such communication could be performed via transmission over a wireless communication protocol such as the NFC protocol.

The computer 902 may be under the control of any suitable operating system (not pictured). Example operating systems include, but are not limited to, Linux® operating systems, UNIX®, Windows® operating systems, macOS®, iOS®, Android® and any other type of operating system.

The computer 902 as illustrated diagrammatically represents at least one example of a possible implementation, where alternatives, additions, and modifications are possible for performing some or all of the described methods, operations, and functions. Although shown separately, in some embodiments, two or more computers 902, systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

Aspects of the present disclosure are described herein with reference to flowchart illustrations and/or block diagrams of computer-implemented methods and computing systems according to embodiments of the disclosure. It will be understood that each block of the flowchart illustrations and/or block diagrams, and combinations of blocks in the flowchart illustrations and/or block diagrams, can be implemented by computer readable program instructions that may be provided to a processor of a computer or other programmable data processing apparatus (the term "apparatus" includes systems and computer program products). The processor may execute the computer readable program instructions there by creating a means for implementing the actions specified in the flowchart illustrations and/or block diagrams. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the actions specified in the flowchart illustrations and/or block diagrams. In particular, the computer readable program instructions may be used to produce a computer-implemented method by executing the instructions to implement the actions specified in the flowchart illustrations and/or block diagrams.

The computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts to carry out an embodiment.

In the flowchart illustrations and/or block diagrams disclosed herein, each block in the flowchart/diagrams may represent a module, segment, or portion of instructions, which comprises one or more executable instructions for implementing the specified logical function(s). In some implementations, the functions noted in the blocks may occur out of the order noted in the Figures. For example, two blocks shown in succession may, in fact, be executed substantially concurrently, or the blocks may sometimes be executed in the reverse order, depending upon the functionality involved.

Computer program instructions are configured to carry out operations of the present disclosure and may be or may incorporate assembler instructions, instruction-set-architecture (ISA) instructions, machine instructions, machine dependent instructions, microcode, firmware instructions, state-setting data, source code, and/or object code written in any combination of one or more programming languages.

An application program may be deployed by providing computer infrastructure operable to perform one or more embodiments disclosed herein by integrating computer readable code into a computing system thereby performing the computer-implemented methods disclosed herein.

Although various computing environments are described above, these are only examples that can be used to incorporate and use one or more embodiments. Many variations are possible.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described to explain the principles of one or more aspects of the disclosure and the practical application, and to enable others of ordinary skill in the art to understand one or more aspects of the disclosure for various embodiments with various modifications as are suited to the particular use contemplated.

What is claimed is:

1. A method, comprising:

receiving, by a processor from a client device, a request to access a web page;

providing, by the processor to the client device, the web page including an artificial intelligence (AI) chatbot, the AI chatbot trained on training data comprising a plurality of decision trees, a plurality of attributes of a plurality of resources, and a plurality of profiles;

determining, by the AI chatbot, a content of the web page;

outputting, by the AI chatbot based on a model configuration decision tree, a first prompt of a plurality of prompts associated with the content;

receiving, by the AI chatbot, a first response to the first prompt;

outputting, by the AI chatbot based on the first response and the model configuration decision tree, a second prompt of the plurality of prompts;

receiving, by the AI chatbot, a second response to the second prompt, wherein the first and second responses are respective ones of a plurality of responses to the plurality of prompts;

comparing, by the AI chatbot, respective attributes of the plurality of responses to metadata attributes of the plurality of resources to filter the plurality of resources to a remaining set of resources;

computing, by the AI chatbot based on the model configuration decision tree and the comparison, a respective score for each resource in the remaining set of resources; and outputting, by the AI chatbot based on the scores, a decision comprising a first resource of the remaining set of resources.

2. The method of claim 1, wherein the decision is further based at least in part on the model configuration decision tree.

3. The method of claim 2, wherein the plurality of prompts are further based at least in part on the model configuration decision tree, wherein the model configuration decision tree is one of the plurality of decision trees of the training data.

4. The method of claim 1, wherein at least one prompt of the plurality of prompts comprises a natural language prompt generated by the AI chatbot.

5. The method of claim 1, wherein the AI chatbot comprises a large language model.

6. The method of claim 1, wherein the content is associated with the plurality of resources.

7. The method of claim 1, wherein providing the web page comprises:

displaying, on the client device, the web page; and based on a predetermined duration of time elapsing, outputting the AI chatbot on the web page.

8. The method of claim 1, further comprising:

accessing, by the processor, a user profile.

9. The method of claim 8, wherein the decision is further based on one or more attributes in the user profile.

10. The method of claim 9, wherein the decision is further based on the plurality of attributes of the plurality of resources.

11. The method of claim 1, further comprising:

generating, by the AI chatbot, the decision comprising a natural language response.

12. The method of claim 11, determining, by the AI chatbot, an image associated with the first resource.

13. The method of claim 12, further comprising:

outputting, by the AI chatbot, the image associated with the first resource proximate to the natural language response.

14. The method of claim 13, further comprising:

determining, by the AI chatbot, a link associated with the first resource.

15. The method of claim 14, further comprising:

outputting, by the AI chatbot, the link as part of the natural language response.

16. The method of claim 15, further comprising:

receiving, by the processor from the client device, a request based on the link.

17. The method of claim 16, further comprising:

returning, by the processor to the client device, another web page at the link.

18. A non-transitory computer-readable storage medium, the computer-readable storage medium including instructions that when executed by a processor, cause the processor to:

receive, from a client device, a request to access a web page;

provide, to the client device, the web page including an artificial intelligence (AI) chatbot, the AI chatbot trained on training data comprising a plurality of decision trees, a plurality of attributes of a plurality of resources, and a plurality of profiles;

determine, by the AI chatbot, a content of the web page;

output, by the AI chatbot based on a model configuration decision tree, a first prompt of a plurality of prompts associated with the content;

receive, by the AI chatbot, a first response to the first prompt;

output, by the AI chatbot based on the first response and the model configuration decision tree, a second prompt of the plurality of prompts;

receive, by the AI chatbot, a second response to the second prompt, wherein the first and second responses are respective ones of a plurality of responses to the plurality of prompts;

compare, by the AI chatbot, respective attributes of the plurality of responses to metadata attributes of the plurality of resources to filter the plurality of resources to a remaining set of resources;

compute, by the AI chatbot based on the model configuration decision tree and the comparison, a respective score for each resource in the remaining set of resources; and output, by the AI chatbot based on the scores, a decision comprising a first resource of the remaining set of resources.

19. An apparatus, comprising:

a processor; and a memory storing instructions that, when executed by the processor, cause the processor to:

receive, from a client device, a request to access a web page;

provide, to the client device, the web page including an artificial intelligence (AI) chatbot, the AI chatbot trained on training data comprising a plurality of decision trees, a plurality of attributes of a plurality of resources, and a plurality of profiles;

determine, by the AI chatbot, a content of the web page;

output, by the AI chatbot based on a model configuration decision tree, a first prompt of a plurality of prompts associated with the content;

receive, by the AI chatbot, a first response to the first prompt;

output, by the AI chatbot based on the first response and the model configuration decision tree, a second prompt of the plurality of prompts;

receive, by the AI chatbot, a second response to the second prompt, wherein the first and second responses are respective ones of a plurality of responses to the plurality of prompts;

compare, by the AI chatbot, respective attributes of the plurality of responses to metadata attributes of the plurality of resources to filter the plurality of resources to a remaining set of resources;

compute, by the AI chatbot based on the model configuration decision tree and the comparison, a respective score for each resource in the remaining set of resources; and output, by the AI chatbot based on the scores, a decision comprising a first resource of the remaining set of resources.

* * * * *